United States Patent
Ishikawa

Patent Number: 6,084,984
Date of Patent: *Jul. 4, 2000

[54] IMAGE PROCESSING METHOD, AND APPARATUS THEREFOR

[75] Inventor: Hisashi Ishikawa, Washimiya-machi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/420,317

[22] Filed: Apr. 10, 1995

Related U.S. Application Data

[62] Division of application No. 08/079,393, Jun. 21, 1993, Pat. No. 5,436,981.

[30] Foreign Application Priority Data

Jun. 24, 1992 [JP] Japan .................................. 4-165791
Jun. 24, 1992 [JP] Japan .................................. 4-165792

[51] Int. Cl.[7] .......................................... G06K 9/34
[52] U.S. Cl. ........................... 382/173; 358/538; 382/216; 382/294
[58] Field of Search .................................. 382/244, 250, 382/171, 172, 173, 175; 358/534, 538, 426, 462, 291

[56] References Cited

U.S. PATENT DOCUMENTS

| | | | |
|---|---|---|---|
| 4,411,015 | 10/1983 | Scherl et al. | 382/51 |
| 4,807,158 | 2/1989 | Blanton et al. | 345/425 |
| 4,821,212 | 4/1989 | Heartz | 345/426 |
| 4,847,786 | 7/1989 | Wang et al. | 382/171 |
| 4,922,349 | 5/1990 | Abe et al. | 358/443 |
| 4,992,955 | 2/1991 | Yabuuchi et al. | 395/128 |
| 5,003,616 | 3/1991 | Orita et al. | 382/171 |

(List continued on next page.)

FOREIGN PATENT DOCUMENTS

| | | | |
|---|---|---|---|
| 1-144778 | 6/1989 | Japan | H04N 1/41 |
| WO89 03150 | 4/1989 | WIPO | H04N 1/40 |

OTHER PUBLICATIONS

Eighth International Conference On Pattern Recognition, 270 Oct. 1986, France, pp. 745–748, Higashino et al., "A Knowledge–based Segmentation Method For Document Understanding".

IEEE 1985, Compint–Computer Aided Technologies, Sep. 9, 1985, Canada, pp. 177–182, Sakai, "Computer Generated Images and Drawings For Industrial Applications".

*Primary Examiner*—Jon Chang
*Assistant Examiner*—Jayanti K. Patel
*Attorney, Agent, or Firm*—Fitzpatrick, Cella, Harper & Scinto

[57] ABSTRACT

A command identifying circuit separates entered image information into a bitmap command representing a line image and an image command representing a half-tone image. A data separating circuit separates layout information, bitmap data and paint-tone data from the separated bitmap command and, in accordance with the layout information, stores the bitmap data in a bitmap memory and the paint-tone data in a block-tone memory. Another data separating circuit separates layout information and image data from the separated image command, and a character/line-image extracting circuit extracts pixels, which constitute a character or line image, contained in the image data separated by the data separating circuit, and stores positional information and tone data regarding the extracted pixels in the bitmap memory and block-tone memory. However, pixels constituting a character or line image are not extracted in an image area within which a line-image area and a half-tone image area overlap each other. An extracted-pixel substitution circuit substitutes prescribed data for a portion of the image data in which a character or line image has been extracted, and a coding circuit codes the image data that has undergone substitution and stores the coded data in an image memory.

13 Claims, 28 Drawing Sheets

U.S. PATENT DOCUMENTS

| | | | |
|---|---|---|---|
| 5,093,872 | 3/1992 | Tutt | 382/243 |
| 5,121,224 | 6/1992 | Ng et al. | 358/462 |
| 5,245,441 | 9/1993 | Ruben | 358/426 |
| 5,255,211 | 10/1993 | Redmond | 364/578 |
| 5,280,367 | 1/1994 | Zuniga | 358/462 |
| 5,301,271 | 4/1994 | Hiratsuka et al. | 395/164 |
| 5,317,411 | 5/1994 | Yoshida | 358/261.2 |
| 5,321,532 | 6/1994 | Ishikawa et al. | 358/534 |
| 5,361,147 | 11/1994 | Katayama et al. | 358/532 |
| 5,371,610 | 12/1994 | Sugawa | 358/538 |
| 5,416,606 | 5/1995 | Katayama et al. | 358/467 |
| 5,444,552 | 8/1995 | Smith, III | 358/534 |
| 5,454,050 | 9/1995 | Nakabayashi et al. | 382/165 |
| 5,479,587 | 12/1995 | Campbell et al. | 395/116 |
| 5,566,255 | 10/1996 | Pavlidis | 382/173 |
| 5,680,478 | 10/1997 | Wang et al. | 382/171 |

F I G. 16A
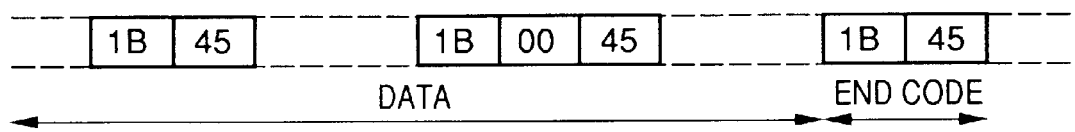
F I G. 16B
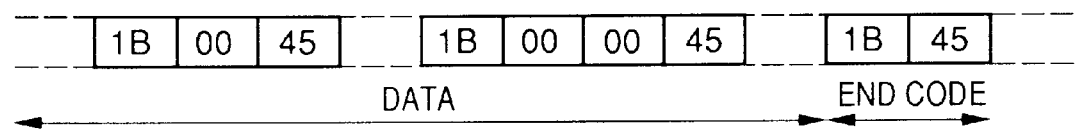
F I G. 16C
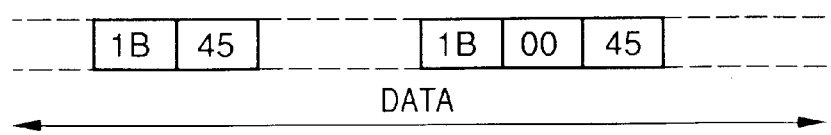

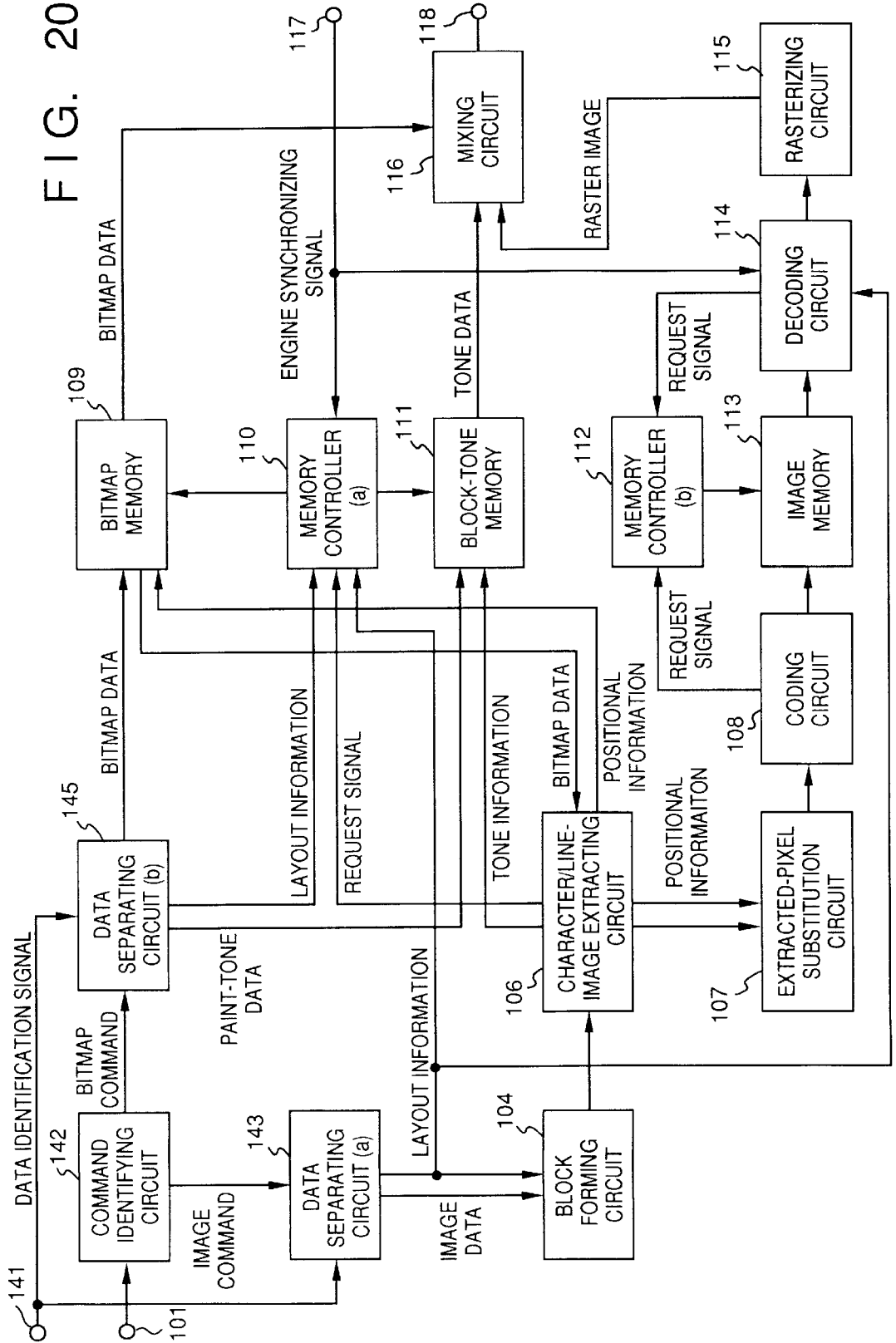

IMAGE PROCESSING METHOD, AND APPARATUS THEREFOR

This application is a division of application Ser. No. 08/079,393 filed Jun. 21, 1993 now U.S. Pat. No. 5,436,981.

BACKGROUND OF THE INVENTION

1. Field of the Invention

This invention relates to an image processing method and apparatus. More particularly, the invention relates to an image processing method and apparatus for storing image information that is a mixture of line drawings, such as characters and graphics, and half-tone images such as photographs having color tones.

2. Description of the Related Art

A known method of efficiently storing image information that is a mixture of line drawings (hereinafter referred to as "text"), such as characters and graphics, and half-tone images (hereinafter referred to as "images") such as photographs having color tones involves partitioning the image into small blocks of, say, 8×8 pixels each, extracting text, subsequently applying an orthogonal transformation, such as a discrete cosine transformation (hereinafter referred to as "DCT"), coding the coefficients of the transformation and storing the same. Such a method is proposed in the specification of Ser. No. 872,988 (filed on Apr. 24, 1992).

FIG. 26 is a block diagram illustrating an image processing apparatus that relies upon a method of recording image information.

As shown in FIG. 26, image data, which is obtained by combining text with an image, and layout information of this image data are applied to an input terminal 51 from an external device such as a host computer or formatter (not shown).

A data separating circuit 52 separates the image data and layout information from the data entered via the terminal 51. The separated layout information is delivered to a block forming circuit 53, a memory controller (a) 58 and a decoding circuit 62. The separated image data is delivered to the block forming circuit 53.

The block forming circuit 53, to which the image data from the data separating circuit 52 is applied, partitions the image data into small blocks each composed of 8×8 pixels.

A text extracting circuit 54 extracts pixels constituting text contained in the 8×8 pixel image data (hereinafter referred to as a "block") that has been entered from the block forming circuit 53, stores the results of judging the extracted pixels in a decision memory 57 and an extracted-pixel substitution circuit 55, and stores tone (color) data of the extracted pixels in an extracted-tone memory 59.

In conformity with the results of the judgment from the text extracting circuit 54, the extracted-pixel substitution circuit 55 replaces the pixel data of a block applied thereto through the text extracting circuit 54 by a mean value of pixels excluding the extracted pixels within the block.

The block from the extracted-pixel substituting circuit 55 is applied to a coding circuit 56, which codes the block using a method suited to multivalued image data. Examples of the method are a method proposed by the JPEG, vector quantization, etc.

An image memory 61 stores the code data output by the coding circuit 56.

A printer engine (not shown) is connected to a terminal 65. When the printer engine is started, an engine synchronizing signal enters the memory controller (a) 58 and the decoding circuit 62 via the terminal 65.

The memory controller (a) 58 performs control in such a manner that the data that has been stored in the decision memory 57 and extracted-tone memory 59 is read out in synchronism with an engine synchronizing signal.

On the basis of the engine synchronizing signal and the layout information that has entered from the data separating circuit 52, the decoding circuit 62 outputs a request to a memory controller (b) 60 in such a manner that the image data will be output at a prescribed timing, and then reads the coded data out of the image memory 61. Next, in an image block designated by the layout information, the decoding circuit 62 decodes the coded data from the image memory 61 to obtain a block of decoded data that is output to a rasterizing circuit 63. The decoding circuit 62 further provides the rasterizing circuit 63 with white data outside the image area.

The rasterizing circuit 63 restores the block that has entered from the decoding circuit 62 to the original 8×8 pixel image data and delivers the raster image that has been formed to a mixing circuit 64.

In dependence upon the results of judgment read out of the decision memory 57, the mixing circuit 64 mixes the tone data read out of the extracted-tone memory 59 and the raster image input from the rasterizing circuit 63 to reconstitute the image data input from the external host computer or the like, and outputs this image data to the printer engine via a terminal 66.

A disadvantage encountered in the example of the related art described above is that since bitmap data is not handled, it is necessary to mix text with a raster image in the host computer or the like in order to output text data or the like to the printer engine. This leads to two problems, namely (1) data transmission and text mixing require time, and (2) there is no compatibility with the conventional software or formatter, etc.

SUMMARY OF THE INVENTION

An object of the present invention is to provide an image processing method and apparatus in which it is unnecessary to mix text with a raster image in a host computer or the like when text data or the like is output to a printer engine.

According to the present invention, the foregoing object is attained by providing an image processing apparatus comprising input means for inputting line-image information and multi-level image information, extracting means for extracting a line-image portion from the multi-level image information, first memory means for storing the line-image information and information of the line-image portion extracted by the extracting means, and second memory means for storing the multi-level image information.

Another object of the invention is to provide an image processing method and apparatus whereby a line image and a multi-level image are mixed while avoiding interference between the line image stored in a first memory and the line image extracted from the multi-level image.

According to the present invention, the foregoing object is attained by providing an image processing apparatus comprising input means for inputting line-image information and multi-level image information, extracting means for extracting a line-image portion from the multi-level image information, first memory means for storing the line-image information and information of the line-image portion extracted by the extracting means, and second memory means for storing the multi-level image information, the extracting means refraining from extracting the line-image portion in an area in which the line-image information exists.

Still another object of the invention is to perform an efficient data transfer.

According to the present invention, the foregoing object is attained by providing an image processing method comprising an input step of inputting line-image information and multi-level image information, an extracting step of extracting a line-image portion from the multi-level image information, a first storing step of storing the line-image information and information of the line-image portion extracted at the extracting step, and a second storing step of storing the multi-level image information, the line-image information and the multi-level image information being transmitted from an external unit, the line-image information being transmitted before the multi-level image information.

A further object of the invention is to provide an image processing apparatus having first memory means for storing first image data, block forming means for forming second image data into prescribed blocks, extracting means for extracting prescribed pixels from the image data formed into blocks by the block forming means, storing positional information of the extracted pixels in the first memory means and storing half-tone data of the extracted pixels in second memory means, converting means for replacing the pixels extracted by the extracting means by prescribed data and converting the second image data into third image data, and third memory means for storing the third image data output by the converting means.

In a preferred embodiment, the first image data is bitmap data, the second image data is multi-level image data, and the first image data is transmitted before the second image data.

In a preferred embodiment, the image processing apparatus further comprises first detecting means for detecting an area of the first image data, second detecting means for detecting an area of a block of interest processed by the extracting means, and comparing means for comparing the area detected by the first detecting means and the area detected by the second detecting means, the extracting means processing the block of interest in dependence upon results of the comparison performed by the comparing means.

In a preferred embodiment, the extracting means does not execute processing of the block of interest in a case where the comparing means has determined that the area detected by the second detecting means overlaps the area detected by the first detecting means but does execute processing of the block of interest in a case where the comparing means has determined that the area detected by the second detecting means does not overlap the area detected by the first detecting means.

In a preferred embodiment, the image processing apparatus further comprises first detecting means for detecting an area of a block of interest processed by the extracting means, and determining means for determining the state of the first image data, which has been stored in the first memory means, corresponding to the area detected by the first detecting means, the extracting means processing the block of interest in dependence upon results of the determination made by the determining means.

In a preferred embodiment, the image processing apparatus further comprises initializing means for initializing the first memory means by prescribed data before the first image data is stored, first detecting means for detecting an area of a block of interest processed by the extracting means, and determining means for determining the state of the stored data in the first memory means corresponding to the area detected by the first detecting means, the extracting means processing the block of interest in dependence upon results of the determination made by the determining means.

In a preferred embodiment, the extracting means does not execute processing of the block of interest in a case where the determining means has determined that the stored data in the first memory means corresponding to the area detected by the first detecting means coincides with initializing data of the initializing means but does execute processing of the block of interest in a case where the determining means has determined that the stored data in the first memory means corresponding to the area detected by the first detecting means does not coincide with initializing data of the initializing means.

The present invention further provides an image processing apparatus comprises separating means for separating data into first information and second information, first forming means for forming first image data from the first information separated by the separating means, first memory means for storing the first image data formed by the first forming means, second forming means for forming second image data from the second information separated by the separating means, extracting means for extracting prescribed pixels from the second image data, storing positional information of the extracted pixels in the first memory means and storing half-tone data of the extracted pixels in second memory means, converting means for replacing the pixels extracted by the extracting means by prescribed data and converting the second image data into third image data, and third memory means for storing the third image data.

In a preferred embodiment, the pixels extracted by the extracting means are line-image pixels and character pixels.

In a preferred embodiment, the separating means separates the first information and the second information in conformity with identification information appended to the first information and second information.

In a preferred embodiment, the first information includes first area information of the first image data formed by the first forming means, the first memory means stores the first image data in conformity with the first area information, the second information includes second area information of the second image data formed by the second forming means, and, in conformity with the second area information, the extracting means stores the positional information of the extracted pixels in the first memory means and stores the tone data of the extracted pixels in the second memory means.

In a preferred embodiment, the image processing apparatus further includes control means for deciding memory capacity allocation of the first memory means, second memory means and third memory means on the basis of the first area information and second area information.

By virtue of this arrangement, it is possible to provide an image processing apparatus in which the first image data and the positional information of the pixels extracted from the second image data are stored in the first memory means, the data of the pixels extracted from the second image data is stored in the second memory means, the data of the extracted pixels is replaced by prescribed data and the second image data is converted into third image data, which is then stored in the third memory means.

In the above-described image processing apparatus for coding and then storing image information composed of a mixture of text and images, it is possible to deal with bitmap data. In a case where text data is to be output to a printer engine, a host computer or the like need not combine text with a raster image.

Further, it is possible to provide an image processing apparatus in which, in order to avoid interference between bitmap data and extracted data, an area of overlap between a bitmap area and an image area is detected, and character/line-image extraction processing is not performed in an area of overlap. As a result, image data can be coded and stored efficiently while preserving the quality of characters and line drawings.

Further, there can be provided an image processing apparatus in which the first image data and the positional information of the pixels extracted from the second image data are stored in the first memory means, the tone data of the pixels extracted from the second image data is stored in the second memory means, the data of the extracted pixels is replaced by prescribed data and the second image data is converted into third image data, which is then stored in the third memory means.

For example, in an image processing apparatus for coding and storing image information composed of a mixture of text and images, it is possible to deal with bitmap data. In a case where text data is to be output to a printer engine, a host computer or the like need not combine text with a raster image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 16A, 16B and 16C are diagrams for describing an example of byte stuffing according to the sixth embodiment;

FIG. 20 is a block diagram illustrating the configuration of an image processing apparatus according to a seventh embodiment of the present invention;

DESCRIPTION OF THE PREFERRED EMBODIMENTS

An image processing apparatus according to embodiments of the present invention will now be described in detail with reference to the drawings.

[First Embodiment]

Figure 1:
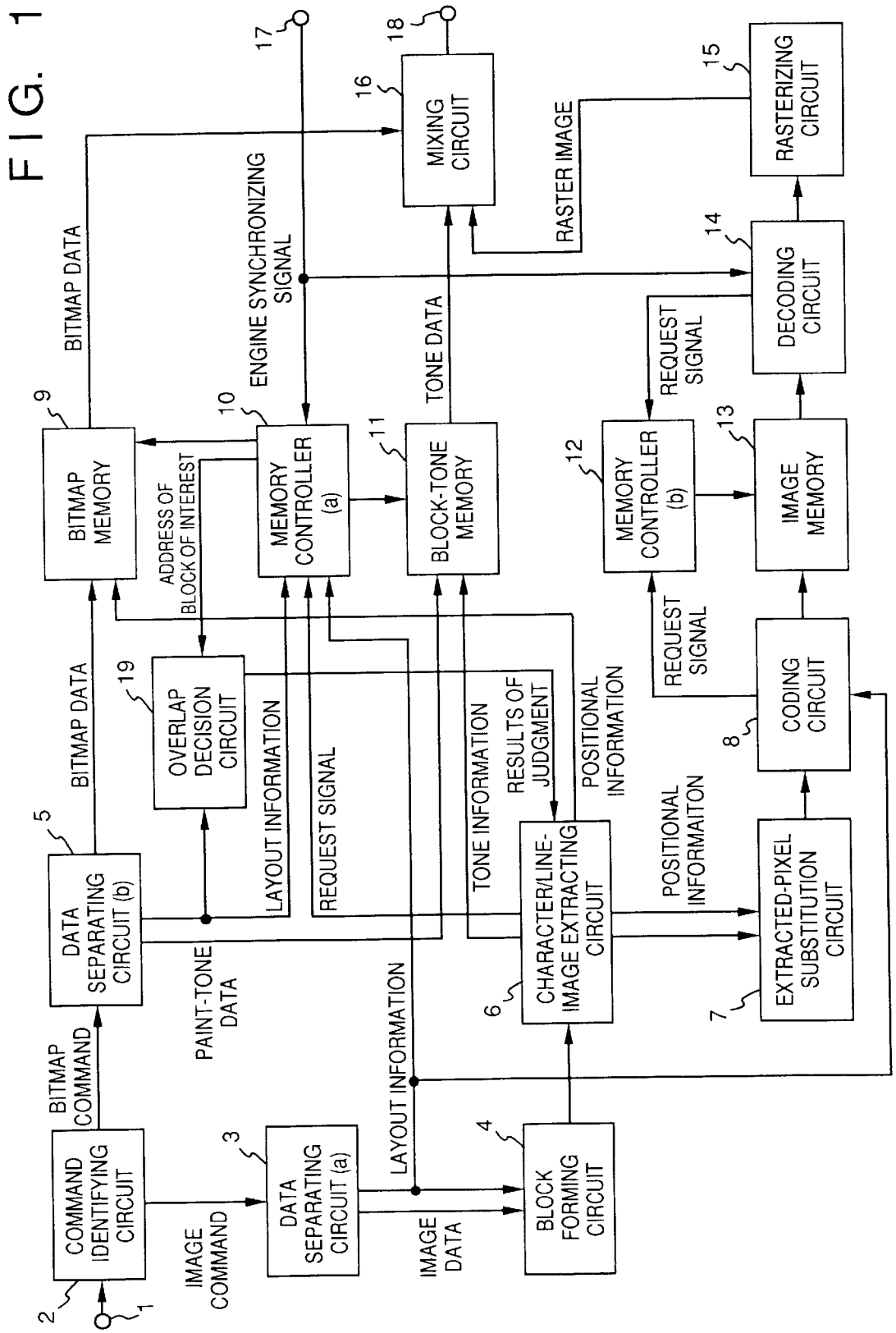
FIG. 1 is a block diagram illustrating the configuration of an image processing apparatus embodying the present invention.

FIG. 1 is a block diagram illustrating the configuration of an image processing apparatus according to an embodiment of the invention.

As shown in FIG. 1, information such as a bitmap command or an image command enters a terminal 1 from an external host computer or formatter (not shown). The terminal 1 is connected to a command identifying circuit 2 which, based upon an identification code contained in the information applied via the terminal 1, determines whether the information is a bitmap command or an image command, outputs information identified as being a bitmap command to a data separating circuit (b) 5 and outputs information identified as being an image command to a data separating circuit (a) 3.

The data separating circuit (b) 5 separates the bitmap information from the command identifying circuit 2 into layout information, paint-tone (color) data and bitmap data representing a character or line drawing. The data separating circuit (b) 5 outputs the separated layout information to memory controller (a) 10 and an overlap decision circuit 19, outputs the separated bitmap data to a bitmap memory 9 constituted by a RAM or the like, and outputs the paint-tone (color) data to a block-tone memory 11 constituted by a RAM or the like.

A data separating circuit (a) 3 separates the image command from the command identifying circuit 2 into layout information and image data, which is multi-level data representing a half-tone image, outputs the separated layout information to a block forming circuit 4, the memory controller (a) 10 and a coding circuit 8, and outputs the separated image data to the block forming circuit 4.

The memory controller (a) 10 produces a control signal as well as an address of the bitmap memory 9 corresponding to the layout information input from the data separating circuit (b) 5, and causes the bitmap data output by the data separating circuit (b) 5 to be stored at the above-mentioned address of the bitmap memory 9. Further, the memory controller (a) 10 simultaneously produces a control signal as well as an address of the block-tone memory 11 corresponding to the layout information input from the data separating circuit (b) 5, and causes the paint-tone (color) data output by the data separating circuit (b) 5 to be stored at the above-mentioned address of the block-tone memory 11. Further, the memory controller (a) 10 simultaneously outputs address information of a block of interest to the overlap-decision circuit 19 based upon the layout information inputted from the data separating circuit (a) 3.

The block forming circuit 4 partitions the image data, which has entered from the data separating circuit (a) 3, into small blocks each composed of 8×8 pixels.

A character/line-image extracting circuit 6, the details of which will be described later, extracts pixels constituting a character or line drawing contained in image data of 8×8 pixels (hereinafter referred to as a "block") input from the block forming circuit 4, outputs positional information of the extracted pixels to the bitmap memory 9 and an extracted-pixel substituting circuit 7, and outputs tone (color) information of the extracted pixels to a block-tone memory 11. In a case where the overlap decision circuit 19 determines that the block of interest is an overlapping block, the character/line-image extracting circuit 6 does not extract pixels constituting a character or line drawing contained in the block. The positional information of extracted pixels is bitmap data in which bits corresponding to extracted pixels are made "1" and other bits are made "0".

In dependence upon the positional information received from the character/line-image extracting circuit 6, the extracted-pixel substituting circuit 7 replaces the pixel data of the block from the character/line-image extracting circuit 6 by, say, a mean value of pixels excluding the extracted pixels within the block. The substitution data, which is set to a value advantageous in terms of coding, described below, may be a mean value, median value or mode of pixels with the exception of extracted pixels within the block, or a value calculated from the pixels surrounding an extracted pixel. In a case where the block of interest is determined to be an overlapping block by the overlap decision circuit 19, pixels are not extracted by the character/line-image extracting circuit 6 and therefore the extracted-pixel substituting circuit 7 does not replaced extracted pixels.

All of the layout information from the data separating circuit (b) 5 enters the overlap decision circuit 19, which compares the effective area of the bitmap command indicated by the layout information and the address of the block of interest input from the memory controller (a) 10. If the address of the block of interest is found to be included in the bitmap area, then decision circuit 19 determines that the block of interest is an overlapping block. The decision rendered by the circuit 19 is output to the character/line-image extracting circuit 6.

The coding circuit 8 is a well-known multi-level image coding circuit for coding the block input from the extracted-pixel substitution circuit 7. The coding circuit 8 uses a method suited to the multi-level image data, such as a color still-picture coding method proposed by the JPEG, vector quantization, etc. It should be noted that the coding circuit 8 causes the layout information, which has entered from the data separating circuit (a) 3, to be incorporated as header information at the beginning of the code data.

In response to a request signal from the coding circuit 8, a memory controller (b) 12 generates a control signal as well as an address of an image memory 13 constituted by a RAM or the like, and causes the code data output by the coding circuit 8 to be stored at the above-mentioned address of the image memory 13.

When one page of data has been stored in each of the memories 9, 11 and 13, a printer engine (e.g., laser beam printer) connected to a terminal 17 is started and an engine synchronizing signal is fed into the memory controller (a) 10 and a decoding circuit 14 via the terminal 17.

The memory controller (a) 10 performs control in such a manner that the data stored in the bitmap memory 9 and block-tone memory 11 is read out in synchronism with the engine synchronizing signal. The bitmap data and tone data read out is mixed with the image data (described later) by a mixing circuit 16, and the resulting mixed image is output to the printer engine from a terminal 18.

When the engine synchronizing signal is applied thereto, the decoding circuit 14 sends a request signal to the memory controller (b) 12 and reads the header information contained in the beginning of the code data stored in the image memory 13. On the basis of the layout information of the image data contained in the header information, the decoding circuit 14 sends a request signal to the memory controller (b) 12 so that the code data will be output at a prescribed timing. In response to the request signal applied by the decoding circuit 14, the memory controller (b) 12 generates a control signal as well as an address of the image memory 13 and causes the code data stored at the above-mentioned address of the image memory 13 to be output. Next, in an image area designated by the layout information, the decoding circuit 14 decodes the coded data from the image memory 13 to obtain a block of decoded data that is output to a rasterizing circuit 15. The decoding circuit 14 further provides the rasterizing circuit 15 with white data outside the image area.

The rasterizing circuit 15 restores the block that has entered from the decoding circuit 14 to the original 8×8 pixel image data and delivers the raster image that has been formed to the mixing circuit 16.

In dependence upon the bitmap data input from the bitmap memory 9, the mixing circuit 16 mixes the tone data input from the block-tone memory 11 and the raster image input from the rasterizing circuit 15 and outputs the mixed-image data to the printer engine via the terminal 18.

Figure 2:
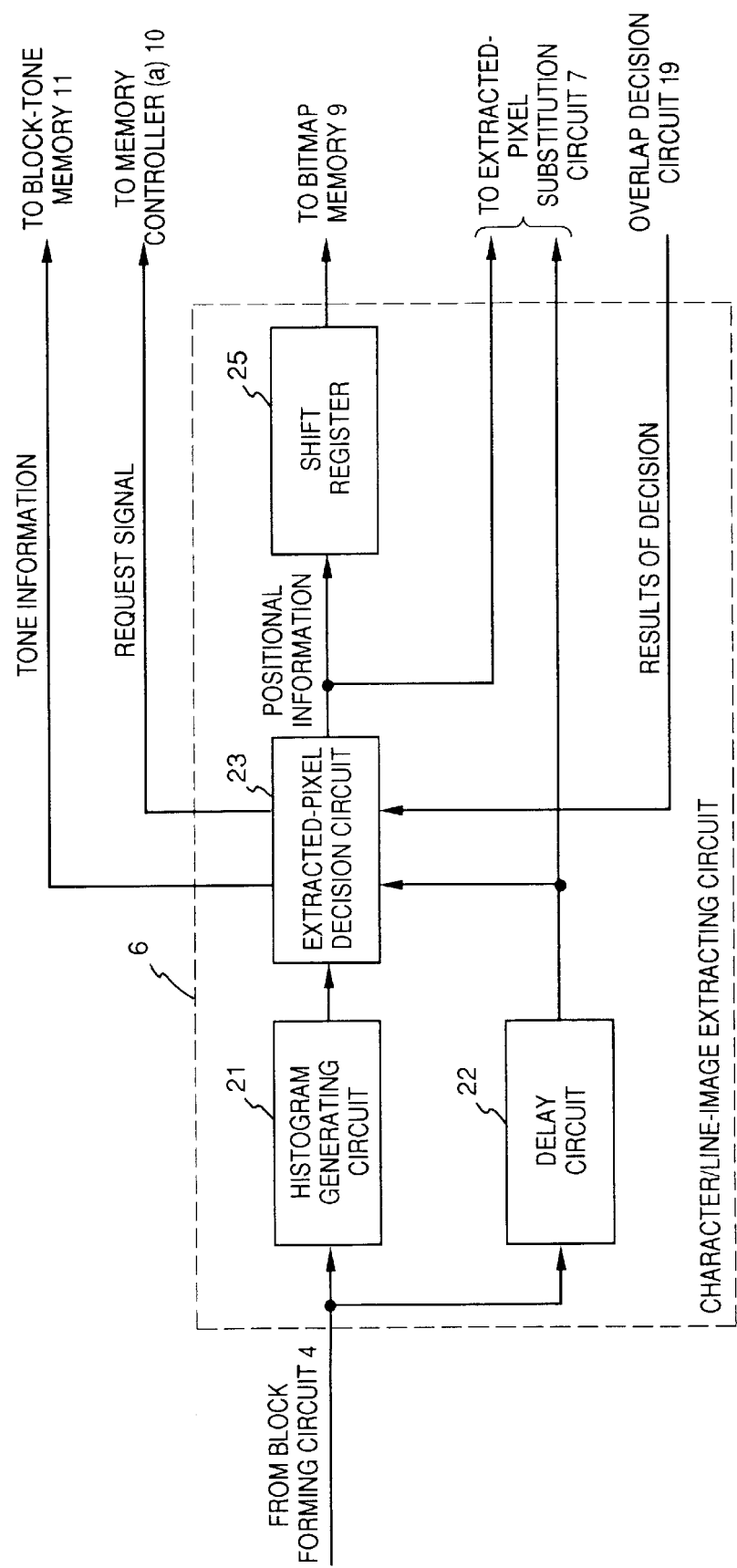
FIG. 2 is a block diagram illustrating the configuration of a character/line-image extracting circuit in FIG. 1.

The details of the character/line-image extracting circuit 6 will now be described. FIG. 2 is a block diagram illustrating the configuration of the character/line-image extracting circuit 6.

As shown in FIG. 2, the character/line-image extracting circuit 6 includes a histogram generating circuit 21 for generating a histogram for each block that enters from the block forming circuit 4 shown in FIG. 1. A delay circuit 22 delays the block, which has been entered from the block forming circuit 4, by an amount of time corresponding to a histogram generation time in the histogram generating circuit 21 and an extracted-tone decision time in an extracted-pixel decision circuit 23, described later, and delivers the delayed block to the extracted-pixel decision circuit 23 as well as to the extracted-pixel substitution circuit 7 shown in FIG. 1.

The extracted-pixel decision circuit 23 determines an extracted tone (color) on the basis of the histogram generated by the histogram generating circuit 21. Next, in a case where the decision rendered by the overlap decision circuit 19 is indicative of a non-overlapping block, the extracted-pixel decision circuit 23 compares the block input from the delay circuit 22 and the determined extracted tone (color). Positional information of a pixel for which the result of comparison indicates coincidence is output from the decision circuit 23 to a shift register 25 and to the extracted-pixel substitution circuit 7 shown in FIG. 1. Tone (color) information of a pixel for which the result of comparison indicates coincidence is output from the decision circuit 23 to the block-tone memory 11 in FIG. 1. The positional information is such that a bit corresponding to a pixel (extracted pixel) for which the result of comparison indicates coincidence is "1", while a bit corresponding to a non-coincidence pixel is "0".

The shift register 25 subjects the position information input from the extracted-pixel decision circuit 23 to a serial-to-parallel conversion and delivers the parallel information to the bitmap memory 9.

At the same time, the extracted-pixel decision circuit 23 outputs a request signal to the memory controller (a) 10 in FIG. 1, thereby causing the positional information output from the shift register 25 to be stored in the bitmap memory 9 and causing the tone information to be stored in the block-tone memory 11 shown in FIG. 1.

In a case where the extracted-pixel decision circuit 23 renders a decision indicating lack of extracted tone (color) or the overlap decision circuit 19 determines that a block of interest is an overlapping block, the positional information of the block of interest becomes all "0"s and the extracted-pixel decision circuit 23 does not output the request signal to the memory controller (a) 10. Accordingly, the items of positional information and tone information of the block are not written in the bitmap memory 9 or the block-tone memory 11.

A method of deciding extracted tone according to this embodiment will now be described.

Depending upon the computer or the like, a character or line drawing added to a natural image is unrelated to the background of the natural image, and therefore the tone of the mixed image becomes discontinuous. Further, the tone of the added character or line drawing usually is the same within a specific area.

On the other hand, a natural image such as a photograph exhibits a high degree of correlation between pixels, and there is a tendency for the tone distribution to spread out owing to noise, which is impressed upon the image when it is read by an image scanner, or as a result of a shading correction.

Accordingly, the pixel of an added character or line drawing can be extracted by detecting a tone in which the tone distribution has no spread and the frequency of occurrence is greater than a predetermined threshold value.

Figure 3:
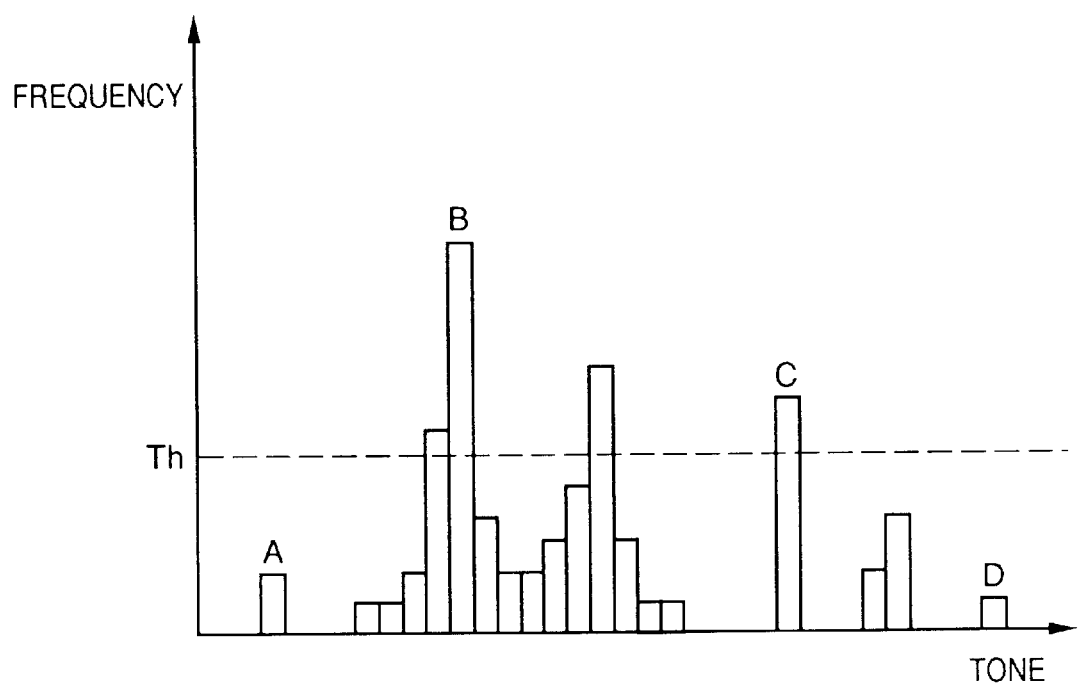
FIG. 3 is an example of a tone-distribution histogram of ordinary image data.

A decision regarding extracted tones in this embodiment will now be described as an example in a case where a tone-distribution histogram of image data of the kind shown in FIG. 3 is generated by the histogram generating circuit 21 illustrated in FIG. 2.

A tone C in FIG. 3 is isolated since the frequencies of tones on either side thereof are 0, and the frequency of the tone C is greater than a threshold value Th. Accordingly, in this embodiment the tone C is employed as an extracted tone. Furthermore, in a case where isolated tones greater than the threshold value Th are plural in number, the tone having the highest frequency, for example, is employed as the extracted tone in this embodiment.

Tones A and D in FIG. 3 are isolated since the frequencies of tones on either side thereof are 0. However, since the frequencies thereof are less than the threshold value Th, in this embodiment the tones A and D are not employed as extracted tones. The reason for this is that there is a great possibility that the tones A and D are isolated tones caused by noise.

Since the tone B in FIG. 3 is not an isolated tone, in this embodiment the tone B is not employed as an extracted tone.

The details of the extracted-pixel substitution circuit 7 will now be described.

Figure 4:
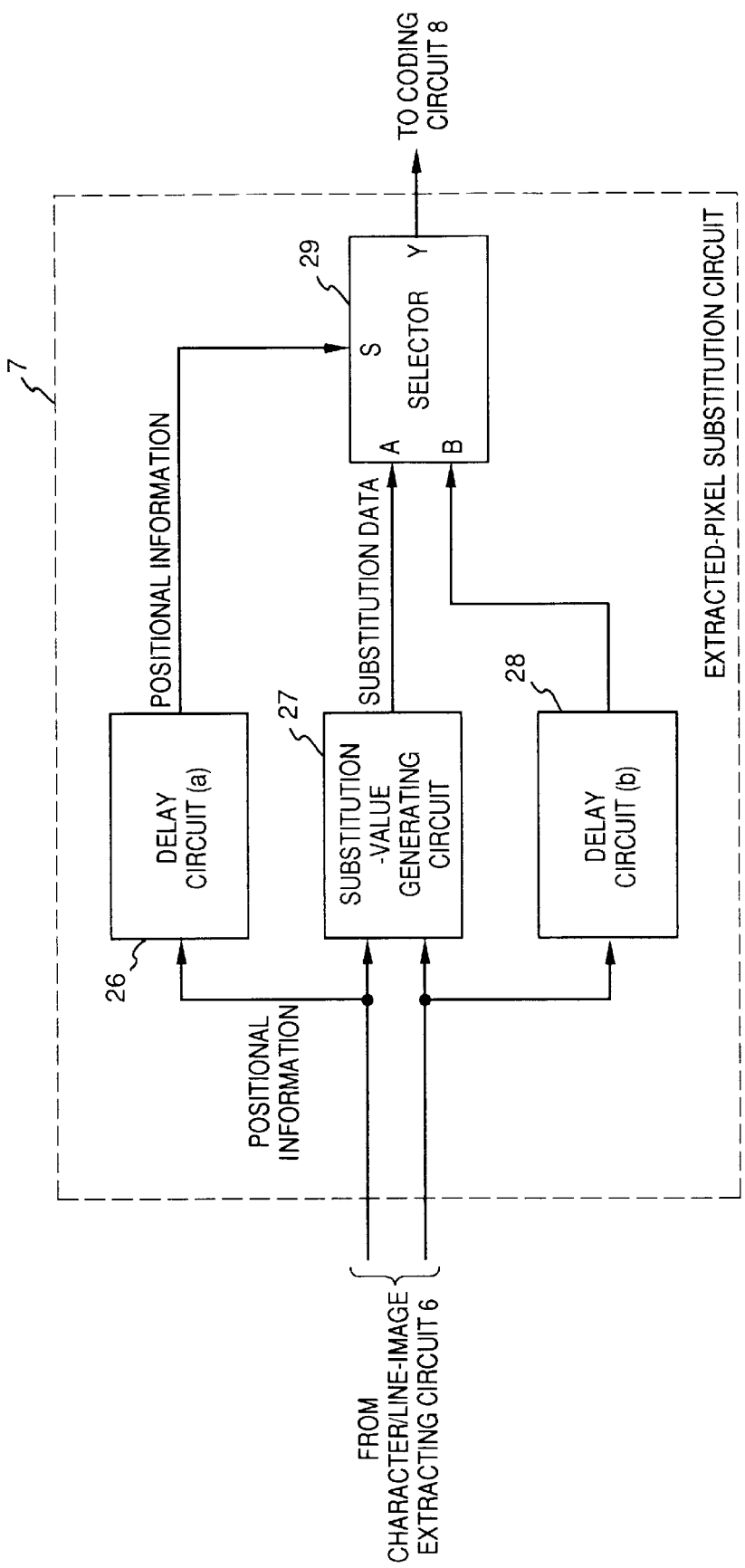
FIG. 4 is a block diagram illustrating the configuration of an extracted-pixel substituting circuit in FIG. 1.

FIG. 4 is a block diagram illustrating the configuration of the extracted-pixel substitution circuit 7.

As shown in FIG. 4, the extracted-pixel substitution circuit 7 includes a substitution-value generating circuit 27 for generating substitution data in dependence upon the positional information input from the character/line-image extracting circuit 6 and the block input from the character/line-image extracting circuit 6. When the coding circuit 8 codes the image data after substitution, the substitution-value generating circuit 27 generates substitution data of a kind that raises coding efficiency. As described above, the substitution data is a mean value of pixels with the exception of extracted pixels within a block.

A delay circuit (a) 26 delays the positional information, which enters from the character/line-image extracting circuit 6, for a period of time equivalent to the substitution-value generation time of the substitution-value generating circuit 27.

A delay circuit (b) 28 delays the block, which enters from the character/line-image extracting circuit 6, for a period of time equivalent to the substitution-value generation time of the substitution-value generating circuit 27.

In dependence upon the positional information from the delay circuit (a) 26 applied to a selection terminal S, a selector 29 selects either the substitution data from the substitution-value generating circuit 27 input to a terminal A or the block from the delay circuit (b) 28 input to a terminal B.

More specifically, the extracted-pixel substitution circuit 7 selects the substitution data when the position information is "1" (extracted pixel) and selects the block when the positional information is "0" (unextracted pixel). The extracted pixel therefore is replaced by the substitution data.

The details of the mixing circuit 16 will now be described.

Figure 5:
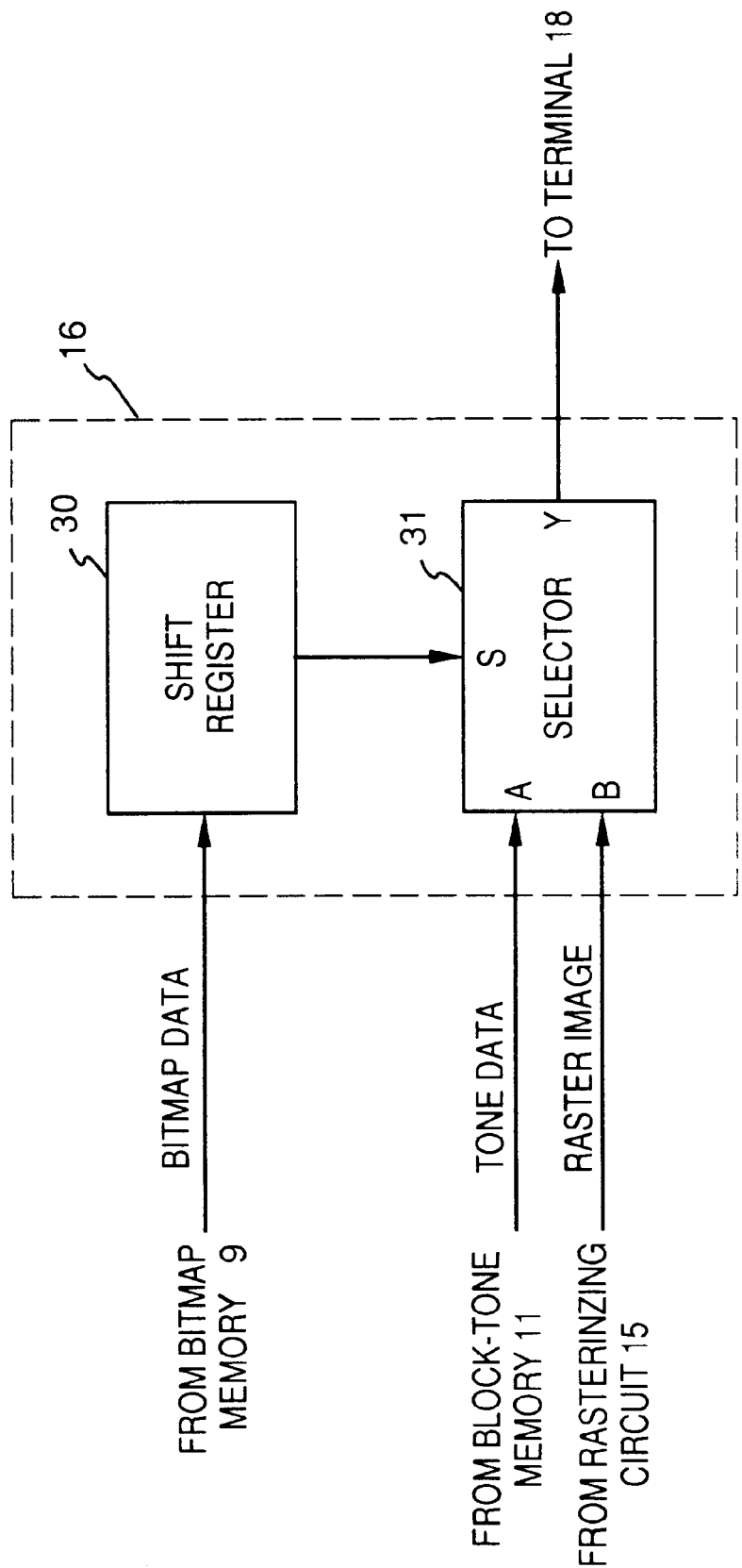
FIG. 5 is a block diagram illustrating the configuration of a mixing circuit in FIG. 1.

FIG. 5 is a block diagram showing the configuration of the mixing circuit 16.

As shown in FIG. 5, the mixing circuit 16 includes a shift register 30 to which the bitmap data or positional information from the bitmap memory 9 is input by the memory controller (a) 10 in byte units in synchronism with the engine synchronizing signal. The shift register 30 subjects the bitmap data or positional information, which has entered in byte units, to a parallel-to-serial conversion to form a selection signal applied to a selector 31.

The selector 31 has a terminal A to which the paint-tone (color) data or tone information (both of which will be referred to as "tone data" hereinafter) from the block-tone memory 11 is input by the memory controller (a) 10 in synchronism with the engine synchronizing signal, and a terminal B to which the raster image from the rasterizing circuit 15 is input by the memory controller (a) 10 in synchronism with the engine synchronizing signal. In conformity with the selection signal that has entered from the shift register 30, the selector 31 selects and delivers either the tone data applied to the terminal A or the raster image applied to the terminal B. The selector 31 selects the tone data when the control signal is "1" and the raster image when the control signal is "0".

Accordingly, the mixing circuit 16 outputs the tone data, which has been stored in the block-tone memory 11, for a pixel corresponding to stored data "1" in the bitmap memory 9, and outputs the raster image (decoded image data) for a pixel corresponding to stored data "0" in the bitmap memory 9. However, the mixing circuit 16 outputs white with regard to the area outside the image area.

More specifically, the paint-tone (color) data stored in the block-tone memory 11 by the bitmap command is output for a pixel for which data "1" has been stored in the bitmap memory 9 by the bitmap command. Further, as for a pixel extracted by the character/line-image extracting circuit 6, data "1" has been stored in the bitmap memory 9 and the tone (color) information thereof has been stored in the block-tone memory 11. Therefore, the extracted pixel is restored by the mixing circuit 16 to the tone data that prevailed prior to the substitution performed by the extracted-pixel substitution circuit 7.

The operation of the overlap decision circuit 19 will be described next.

Figure 6:
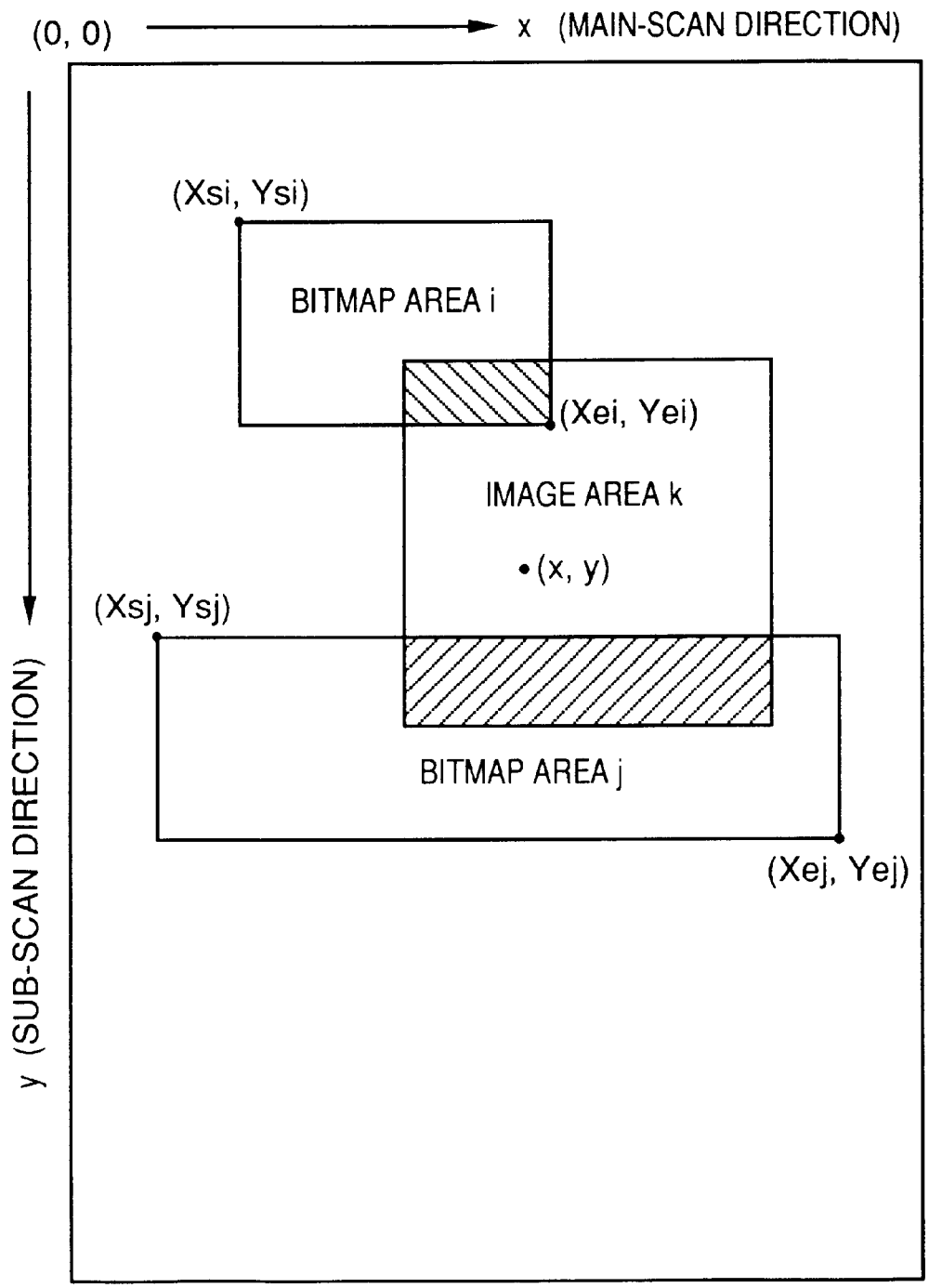
FIG. 6 is a diagram showing an example of the layout of bitmap data and image data according to this embodiment.

FIG. 6 is a diagram illustrating an example of the layout of the bitmap data and image data according to this embodiment. In this example, bitmap data is written in areas i, j by bitmap commands i, j, and image data is written in area k by an image command k.

In a case where extraction of a character/line-image has been performed with regard to a block having the overlapping hatched portions (overlapping areas) shown in FIG. 6, a problem arises in that the bitmap data of the overlapping areas stored in the bitmap 9 is destroyed. The purpose of the overlap decision circuit 19 is to prevent this destruction of the bitmap data.

A starting address $(X_{si},Y_{si})$ and end address $(X_{ei},Y_{ei})$ of the area i and a starting address $(X_{sj},Y_{sj})$ and end address $(X_{ej},Y_{ej})$ of the area j are set in the overlap decision circuit 19 prior to entry of the image command k. When the image command k is applied thereto, the overlap decision circuit 19 compares an address (x,y) of the block of interest input from the memory controller (a) 10 with the four addresses mentioned above. If even one address satisfying the following relations is found to exist, the block of interest is judged to be an overlapping block:

$X_{si} \leq x \leq X_{ei}$ and $Y_{si} \leq y \leq Y_{ei}$ $X_{sj} \leq x \leq X_{ej}$ and $Y_{sj} \leq y \leq Y_{ej}$ Accordingly, the character/line-image extracting circuit 6 does not perform character/line-image extraction with regard to the block having the overlapping areas in FIG. 6, and therefore the bitmap data of the overlapping areas stored in the bitmap memory 9 is preserved.

In accordance with this embodiment, as described above, bitmap data can be handled with a memory capacity the same as that of the conventional image processing apparatus by identifying the information entered by the command identifying circuit 2. Furthermore, since overlapping between a bitmap area and an image area is detected and character/line-image extraction is not performed with regard to the overlapping area, the bitmap data contained in the overlapping area is preserved and mixing with the image data becomes possible. Thus, in accordance with this embodiment, when text data is output to a printer engine, it is unnecessary for text data to be mixed with an image in a host computer or the like. This solves the aforementioned problems encountered in the conventional image processing apparatus, namely (1) data transmission and text mixing require time, and (2) there is no compatibility with conventional software or formatter, etc.

Further, in accordance with this embodiment, since it is unnecessary to handle image data in which text is mixed with an image, it is possible to improve upon the drawbacks of the conventional image processing apparatus, namely the decline in coding efficiency and the decline in picture quality resulting from text data that has not been extracted.

[Second Embodiment]

An image processing apparatus according to a second embodiment of the present invention will now be described. Elements in the second embodiment approximately the same as those of the first embodiment will be designated by like reference characters and need not be described again.

Figure 7:
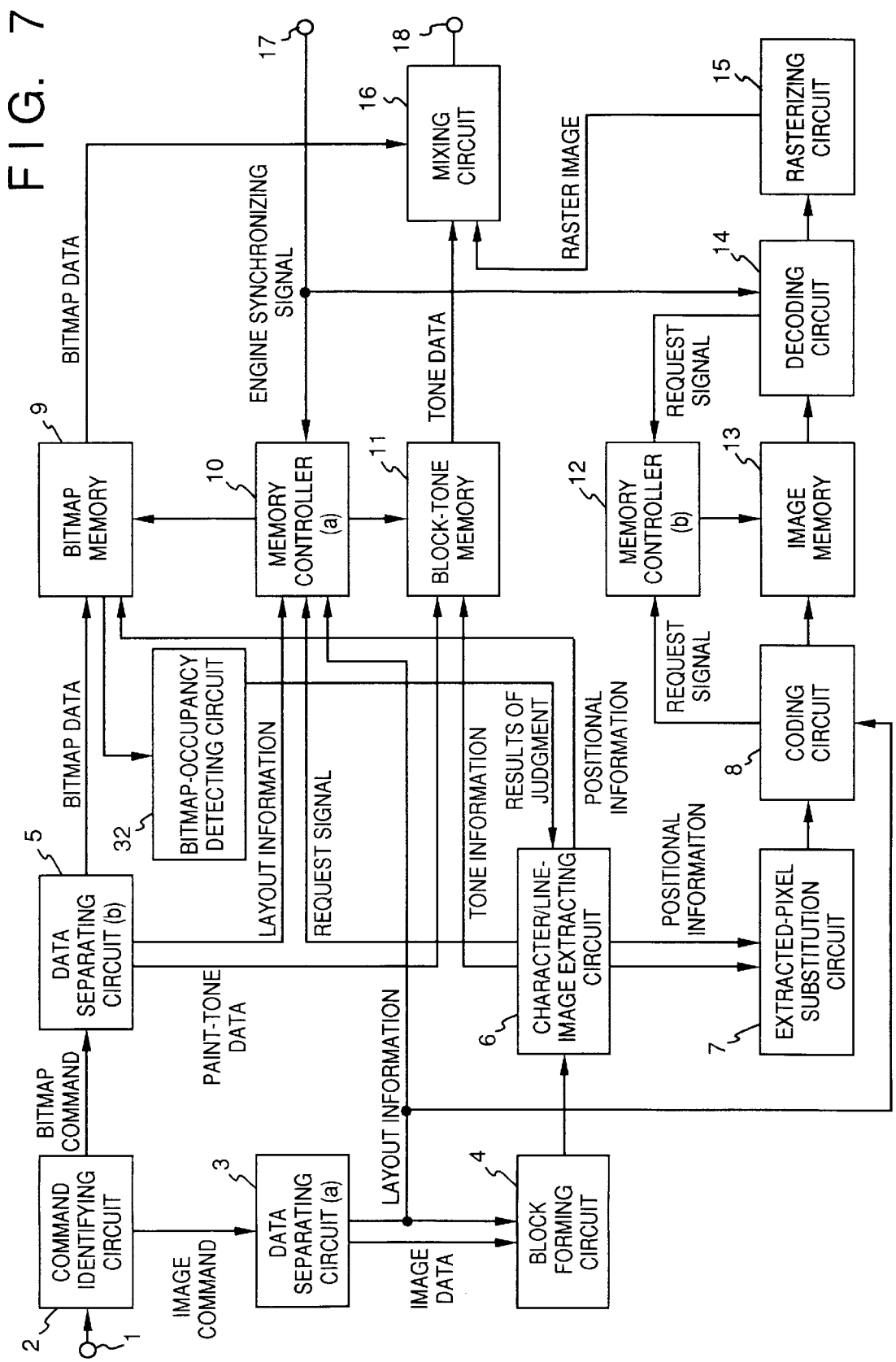
FIG. 7 is a block diagram illustrating the configuration of an image processing apparatus according to a second embodiment of the present invention.

FIG. 7 is a block diagram illustrating the configuration of the image processing apparatus according to the second embodiment.

The arrangement shown in FIG. 7 includes a bitmap-occupancy detecting circuit 32 to which the bitmap data corresponding to the block of interest from the bitmap memory 9 is input under the control of the memory controller (a) 10 at the time of image-command processing. The bitmap-occupancy detecting circuit 32 determines that the bitmap corresponding to the block of interest is unused if all of the input bitmap data is "0", and determines that the bitmap corresponding to the block of interest is being used if even one item of input bitmap data is "1".

The result of the decision rendered by the bitmap-occupancy detecting circuit 32 is fed into the character/line-image extracting circuit 6, which does not execute character/line-image extraction processing in a case where it has been determined, based upon the decision, that the bitmap corresponding to the block of interest is being used.

In other words, according to this embodiment, the processing of image data is executed after all of the bitmap data in one page has been stored in the bitmap memory 9. Therefore, since a paint pixel is not contained in a block for which all of the bitmap data is "0", the bitmap data will not be destroyed even if the extracted results have been stored in the bitmap memory 9 or block-tone memory 11 by the character/line-image extracting circuit 6.

In accordance with this embodiment, as described above, effects similar to those of the first embodiment are obtained. Moreover, if all of the bitmap data of the block of interest is "0", character/line-image extraction processing is executed, even if the area is one in which a bitmap is effective. As a result, coding efficiency and picture quality can be improved.

[Third Embodiment]

An image processing apparatus according to a third embodiment of the present invention will now be described. Elements in the third embodiment approximately the same as those of the first embodiment will be designated by like reference characters and need not be described again.

Figure 8:
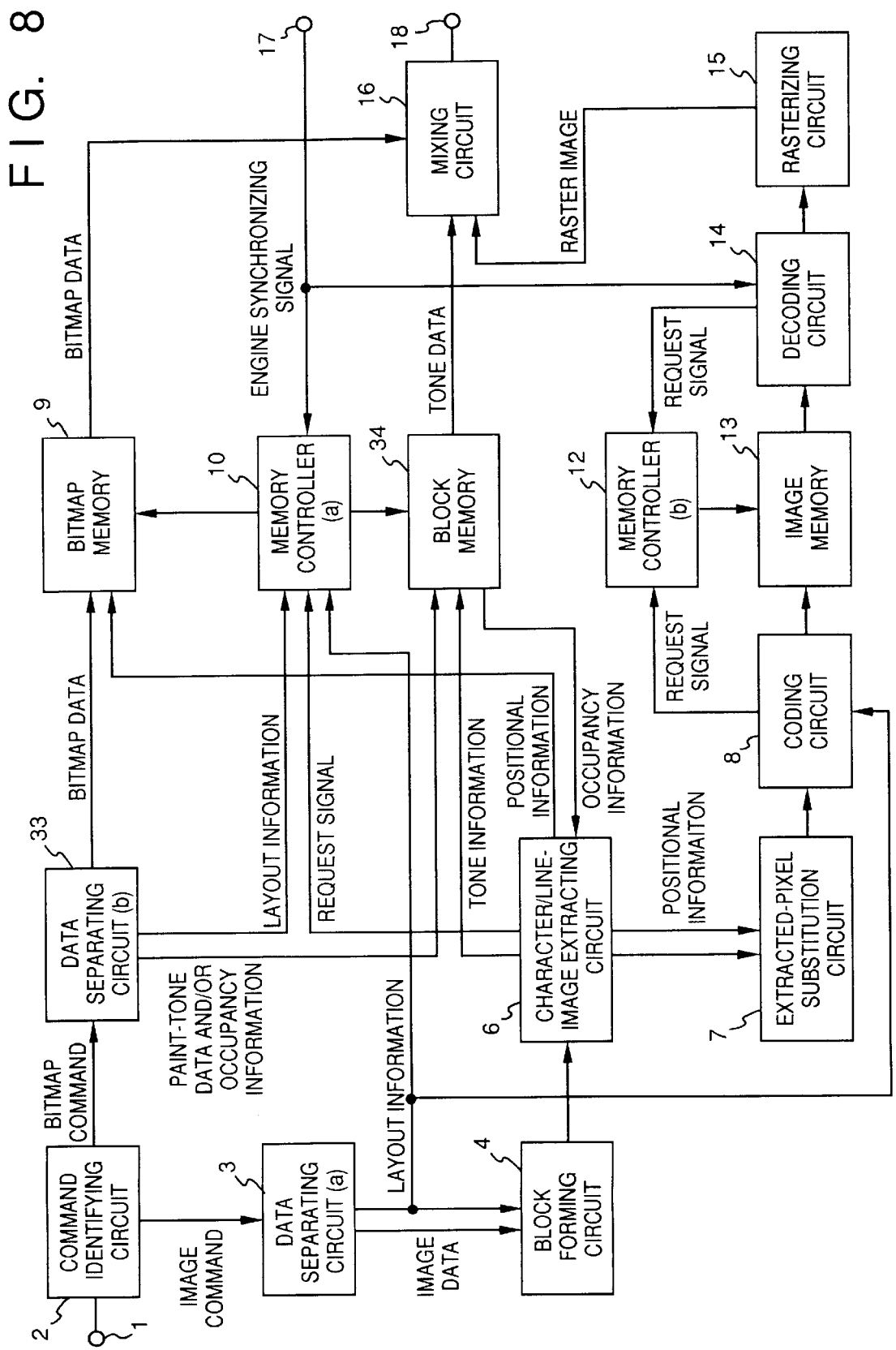
FIG. 8 is a block diagram illustrating the configuration of an image processing apparatus according to a third embodiment of the present invention.

FIG. 8 is a block diagram illustrating the configuration of the image processing apparatus according to the third embodiment.

The arrangement shown in FIG. 8 includes a data separating circuit (b) 33, which separates layout information, paint-tone (color) data and bitmap data from the bitmap command that has been entered from the command identifying circuit 2, and delivers the separated layout information to the memory controller (a) 10, the separated bitmap data to the bitmap memory 9 and the paint-tone (color) data to a block memory 34, which is constituted by a RAM or the like. In addition, the circuit 33 provides the block memory with occupancy information, which represents the occupancy of the bitmap.

The occupancy information is "1" when the data stored in the bitmap 9 is "1". Accordingly, in addition to the paint-tone (color) data, occupancy information "1" is stored in the block memory 34 if "1" data has been stored in the bitmap memory 9. Further, according to this embodiment, the bitmap memory 9 and block memory 34 are cleared before the first bitmap command is entered.

When all of the bitmap data has been stored in the bitmap memory 9, the image command enters from the terminal 1 and the occupancy information corresponding to the block of interest is input to the character/line-image extracting circuit 6 from the block memory 34 under the control of the memory controller (a) 10. The character/line-image extracting circuit 6 does not perform character/line-image extraction processing if the occupancy information is "1".

In accordance with this embodiment, as described above, the effects of the first and second embodiments are obtained. Moreover, it is unnecessary to examine all of the bitmap data of the block of interest, i.e., it suffices merely to read the occupancy information out of the block memory 34. As a result, the circuitry can be simplified and it is possible to shorten the time needed to discriminate the occupancy of the bitmap.

[Fourth Embodiment]

An image processing apparatus according to a fourth embodiment of the present invention will now be described. Elements in the fourth embodiment approximately the same as those of the first embodiment will be designated by like reference characters and need not be described again.

Figure 9:
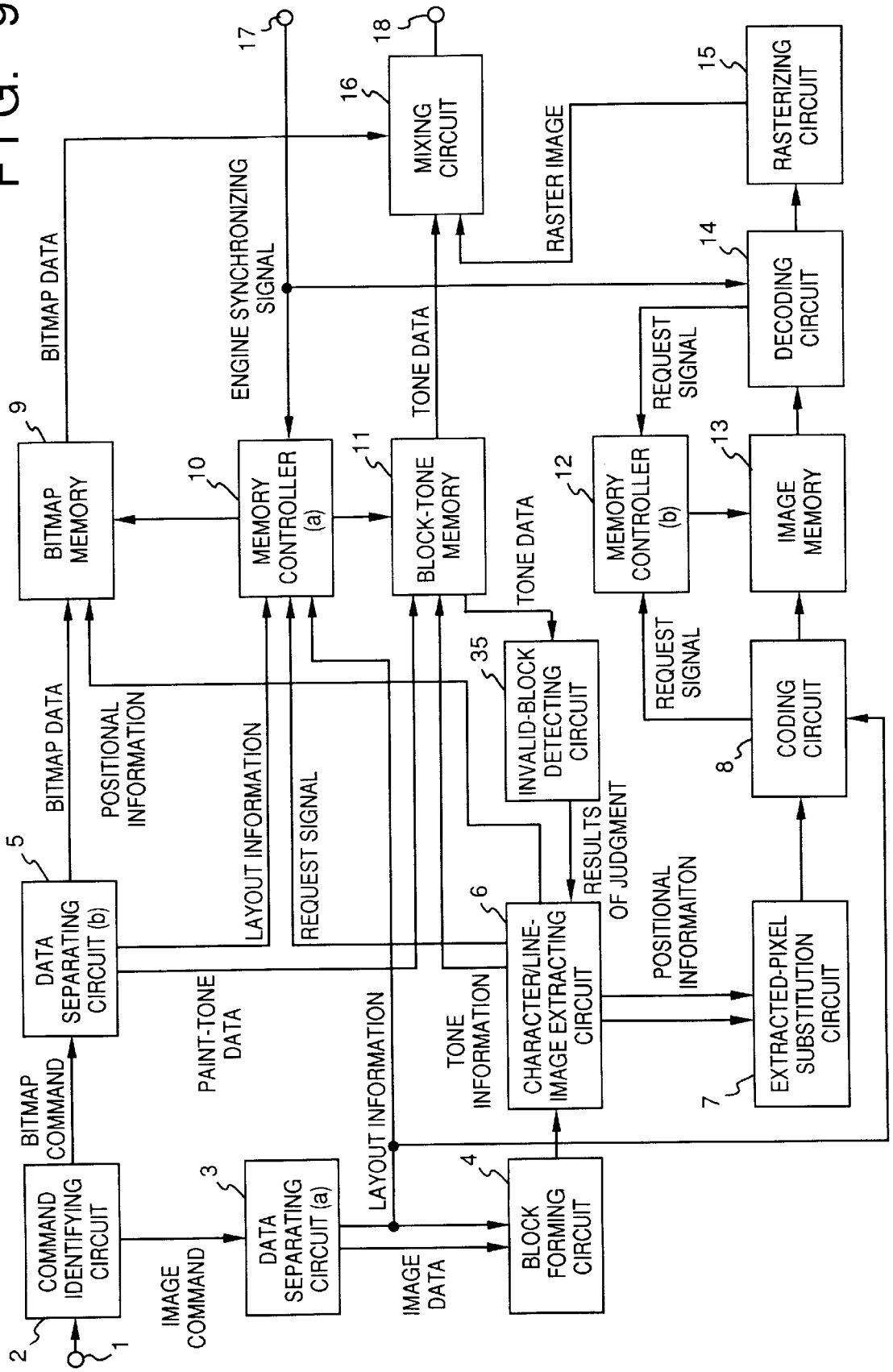
FIG. 9 is a block diagram illustrating the configuration of an image processing apparatus according to a fourth embodiment of the present invention.

FIG. 9 is a block diagram illustrating the configuration of the image processing apparatus according to the fourth embodiment.

The arrangement shown in FIG. 9 includes an invalid-block detecting circuit 35 to which the tone data corresponding to the block of interest is input from the block-tone memory 11 under the control of the memory controller (a) 10. In a case where the entered tone data coincides with background data, described below, the invalid-block detecting circuit 35 judges that the bitmap corresponding to the block of interest is invalid. If the tone data does not coincide with the background data, the bitmap corresponding to the block of interest is judged to be valid.

The background data is data that has been set in the block-tone memory 11 by, say, a clear signal before the first bitmap command enters. For example, the background data is data representing the color white.

When all of the bitmap data has been stored in the bitmap memory 9, the image command enters from the terminal 1 and the tone data corresponding to the block of interest is input to the invalid-block detecting circuit 35 from the block-tone memory 11 by the memory controller (a) 10. If the entered tone data does not coincide with the background data, the invalid-block detecting circuit 35 outputs the result of the decision, which indicates that the bitmap corresponding to the block of interest is effective. As a result, the character/line-image extracting circuit 6 does not execute character/line-image extraction processing.

More specifically, in a bitmap region in this embodiment, the paint-tone (color) data stored in the block-tone memory 11 is output if the bitmap data is "1", and background data set in the block-tone memory 11 is output if the bitmap data is "0". Accordingly, in this embodiment, if it is so arranged that the paint-tone (color) data is stored in the block-tone memory 11 in a case where the bitmap data is "1" after the block-tone memory 11 has been initialized by the background data (e.g., white data), it can be determined whether the bitmap corresponding to the block of interest is valid/invalid by determining whether the tone data read out of the block-tone memory 11 coincides with the background data.

By way of example, in a case where the tone data read out of the block-tone memory 11 coincides with the background data, the output of the mixing circuit 16 becomes background data in its entirety within the block, even if all of the bitmap data corresponding to the block of interest is not "0". As a result, the bitmap is data without meaning. In other words, the block is an invalid block.

It is described in the foregoing that when the block-tone memory 11 is initialized by background data and character/line-image extraction processing is executed, bitmap data corresponding to the block of interest is detected as being valid or invalid based upon whether the tone data of the block-tone memory 11 corresponding to the block of interest and the background data coincide. However, the invention is not limited to this arrangement. For example, specific tone data can be adopted as an identification code and used instead of background data. However, in a case where specific tone data is made an identification code, the tone data concerning the identification code cannot be used as a paint tone, and the identification code must be converted to background data by the mixing circuit 16, etc.

In accordance with this embodiment, as described above, effects similar to those of the first through third embodiments can be obtained using a smaller memory capacity. Moreover, since the detection of invalid bitmap data is performed based upon tone data, the bitmap memory can be utilized effectively.

[Fifth Embodiment]

An image processing apparatus according to a fifth embodiment of the present invention will now be described.

Figure 10:
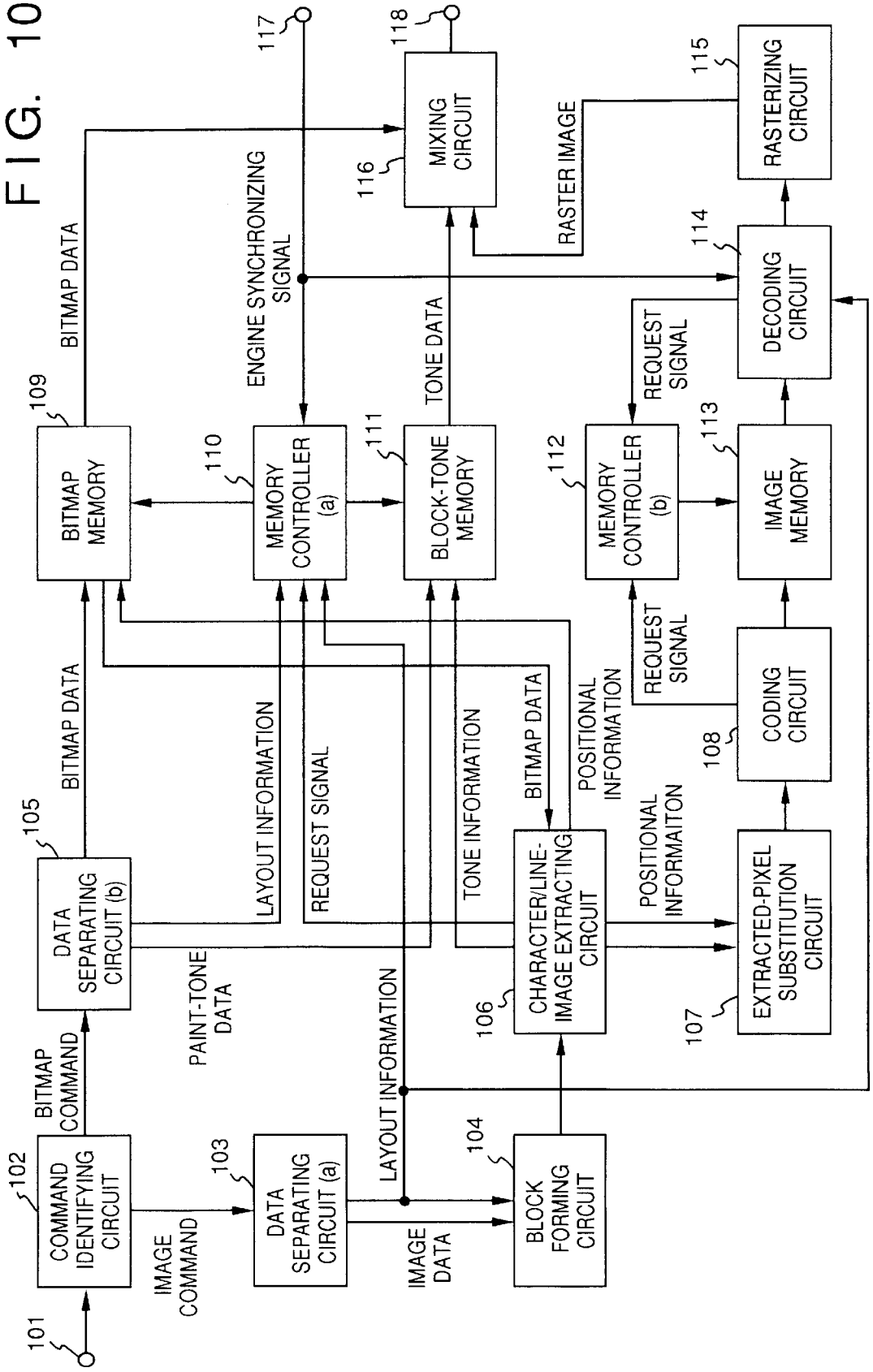
FIG. 10 is a block diagram illustrating the configuration of an image processing apparatus according to a fifth embodiment of the present invention.

FIG. 10 is a block diagram illustrating the configuration of the image processing apparatus according to the fifth embodiment of the invention.

As shown in FIG. 10, the information such as the bitmap command or image command enters a terminal 101 from an external host computer or formatter. The terminal 101 is connected to a command identifying circuit 102 which, based upon an identification code (described later) contained in the information applied via the terminal 101, determines whether the information is the bitmap command or the image command, outputs information identified as being the bitmap command to a data separating circuit (b) 105 and outputs information identified as being an image command to a data separating circuit (a) 103.

The data separating circuit (b) 105 separates the bitmap information from the command identifying circuit 102 into layout information, paint-tone (color) data and bitmap data. The data separating circuit (b) 105 outputs the separated layout information to memory controller (a) 110, outputs the separated bitmap data to a bitmap memory 109 constituted by a RAM or the like, and outputs the paint-tone (color) data to a block-tone memory 111 constituted by a RAM or the like.

The memory controller (a) 110 produces a control signal as well as an address of the bitmap memory 109 corresponding to the layout information input from the data separating circuit (b) 105, and causes the bitmap data output by the data separating circuit (b) 105 to be stored at the above-mentioned address of the bitmap memory 109. Further, the memory controller (a) 110 simultaneously produces a control signal as well as an address of the block-tone memory 111 corresponding to the layout information input from the data separating circuit (b) 105, and causes the paint-tone (color) data output by the data separating circuit (b) 105 to be stored at the above-mentioned address of the block-tone memory 111.

A data separating circuit (a) 103 separates the image command from the command identifying circuit 102 into layout information and image data, outputs the separated layout information to a block forming circuit 104, the memory controller (a) 110 and a decoding circuit 114, and outputs the separated image data to the block forming circuit 104.

The block forming circuit 104 partitions the image data, which has entered from the data separating circuit (a) 103, into small blocks each composed of 8×8 pixels.

A character/line-image extracting circuit 106, the details of which will be described later, extracts pixels constituting a character or line drawing contained in image data of 8×8 pixels (hereinafter referred to as a "block") input from the block forming circuit 104, outputs positional information of the extracted pixels to the bitmap memory 109 and an extracted-pixel substituting circuit 107, and outputs tone (color) information of the extracted pixels to a block-tone memory 111. The positional information of extracted pixels is bitmap data in which bits corresponding to extracted pixels are made "1" and other bits are made "0".

In dependence upon the positional information received from the character/line-image extracting circuit 106, the extracted-pixel substituting circuit 107 replaces the pixel data of the block from the character/line-image extracting circuit 106 by, say, a mean value of pixels excluding the extracted pixels within the block. The substitution data, which is set to a value advantageous in terms of coding, described below, may be a mean value, median value or mode of pixels with the exception of extracted pixels within the block, or a value calculated from the pixels surrounding an extracted pixel.

The coding circuit 108 is a well-known multi-level image coding circuit for coding the block input from the extracted-pixel substitution circuit 107. The coding circuit 108 uses a method suited to the multi-level image data, such as a color still-picture coding method proposed by the JPEG, vector quantization, etc.

In response to a request signal from the coding circuit 108, a memory controller (b) 112 generates a control signal as well as an address of an image memory 113 constituted by a RAM or the like, and causes the code data outputted by the code circuit 108 to be stored at the above-mentioned address of the image memory 113.

When a printer engine (e.g., laser beam printer) connected to a terminal 117 is started, an engine synchronizing signal is fed into the memory controller (a) 110 and the decoding circuit 114 via the terminal 117.

The memory controller (a) 110 performs control in such a manner that the data stored in the bitmap memory 109 and block-tone memory 111 is read out in synchronism with the engine synchronizing signal.

On the basis of the engine synchronizing signal and the layout information, which enters from the data separating circuit (a) 103, the decoding circuit 114 sends a request signal to the memory controller (b) 112 so that the code data will be output at a prescribed timing. In response to the request signal applied by the decoding circuit 114, the memory controller (b) 112 generates a control signal as well as an address of the image memory 113 and causes the code data stored at the above-mentioned address of the image memory 113 to be output. Next, in an image area designated by the layout information, the decoding circuit 114 decodes the coded data from the image memory 113 to obtain a block of decoded data that is output to a rasterizing circuit 115. The decoding circuit 114 further provides the rasterizing circuit 115 with white data outside the image area.

The rasterizing circuit 115 restores the block that has entered from the decoding circuit 114 to the original 8×8 pixel image data and delivers the raster image that has been formed to a mixing circuit 116.

In dependence upon the bitmap data input from the bitmap memory 109, the mixing circuit 116 mixes the tone data input from the block-tone memory 111 and the raster image input from the rasterizing circuit 115 and outputs the mixed-image data to the printer engine via a terminal 118.

Figure 11:
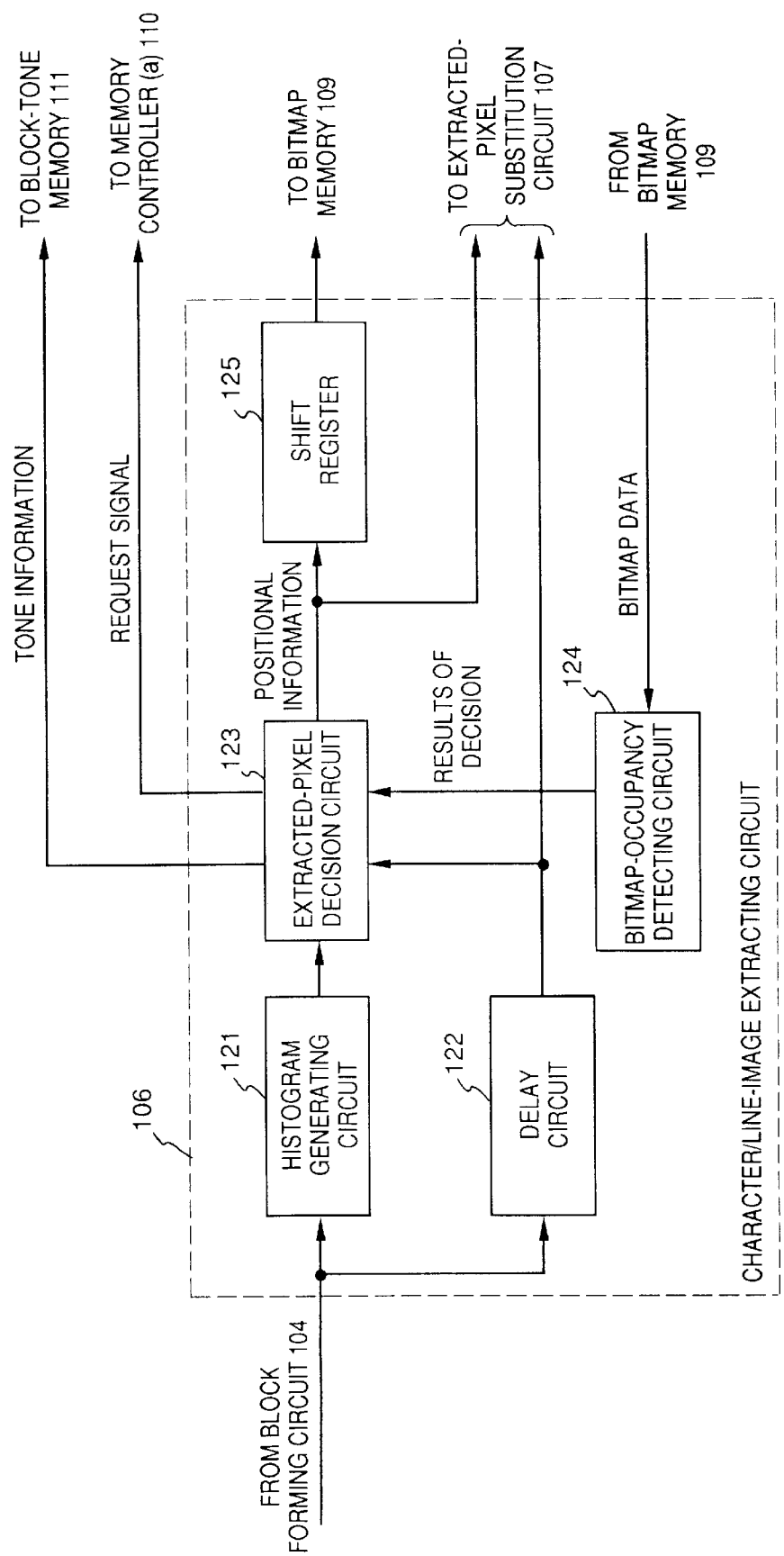
FIG. 11 is a block diagram illustrating the configuration of a character/line-image extracting circuit in FIG. 1.

The details of the character/line-image extracting circuit 106 will now be described. FIG. 11 is a block diagram illustrating the configuration of the character/line-image extracting circuit 106.

As shown in FIG. 11, the character/line-image extracting circuit 106 includes a histogram generating circuit 121 for generating a histogram for each block that enters from the block forming circuit 104 shown in FIG. 10. A delay circuit 122 delays the block, which has entered from the block forming circuit 104, by an amount of time corresponding to histogram generation time in the histogram generating circuit 121 and extracted-tone decision time in an extracted-pixel decision circuit 123, described later, and delivers the delayed block to the extracted-pixel decision circuit 123 as well as to the extracted-pixel substitution circuit 107 shown in FIG. 10. A bitmap-occupancy detecting circuit 124 examines the data stored in the bitmap memory 109 (FIG. 10) corresponding to the block of interest. The bitmap-occupancy detecting circuit 124 determines that the bitmap is unused if the bits corresponding to the block of interest are all "0".

The extracted-pixel decision circuit 123 determines an extracted tone (color) on the basis of the histogram generated by the histogram generating circuit 121. Next, in a case where the decision rendered by the bitmap-occupancy detecting circuit 124 indicates that the bitmap is unused, the extracted-pixel decision circuit 123 compares the block input from the delay circuit 122 and the determined extracted tone (color). Positional information of a pixel for which the result of comparison indicates coincidence is output to a shift register 125 and to the extracted-pixel substitution circuit 107 shown in FIG. 10. Tone (color) information of a pixel for which the result of comparison indicates coincidence is output to the block-tone memory 111 in FIG. 10. The positional information is such that a bit corresponding to a pixel (extracted pixel) for which the result of comparison indicates coincidence is "1", while a bit corresponding to a non-coincidence pixel is "0".

The shift register 125 subjects the positional information input from the extracted-pixel decision circuit 123 to a serial-to-parallel conversion and delivers the parallel information to the bitmap memory 109.

At the same time, the extracted-pixel decision circuit 123 outputs a request signal to the memory controller (a) 110 in FIG. 10, thereby causing the positional information outputted from the shift register 125 to be stored in the bitmap memory 109 and causing the tone information to be stored in the block-tone memory 111 shown in FIG. 10.

In a case where the extracted-pixel decision circuit 123 renders a decision indicating lack of extracted tone (color) or the bitmap-occupancy detecting circuit 124 determines that the bitmap corresponding to the block of interest is in use, the positional information of the block of interest becomes all "0"s and the extracted-pixel decision circuit 123 does not output the request signal to the memory controller (a) 110. Accordingly, the items of positional information and tone information of the block are not written in the bitmap memory 109 or the block-tone memory 111.

The method of determining extracted tones in this embodiment is the same as the method of the first embodiment described with reference to FIG. 3. This method need not be described again.

Further, the detailed construction of the extracted-pixel substitution circuit 107 is the same as that of the extracted-pixel substitution circuit 7 in the first embodiment shown in FIG. 4 and a description thereof is omitted.

Similarly, the detailed construction of the mixing circuit 116 is the same as that of the mixing circuit 16 in the first embodiment shown in FIG. 5 and a description thereof is omitted.

Thus, according to this embodiment, the paint-tone (color) data stored in the block-tone memory 111 by the bitmap command is output for a pixel for which data "1" has been stored in the bitmap memory 109 by the bitmap command. Further, as for a pixel extracted by the character/line-image extracting circuit 106, data "1" has been stored in the bitmap memory 109 and the tone (color) information thereof has been stored in the block-tone memory 111. Therefore, the extracted pixel is restored by the mixing circuit 116 to the tone data that prevailed prior to the substitution performed by the extracted-pixel substitution circuit 107.

The details of the command which enters the terminal 101 will now be described.

Figure 12:
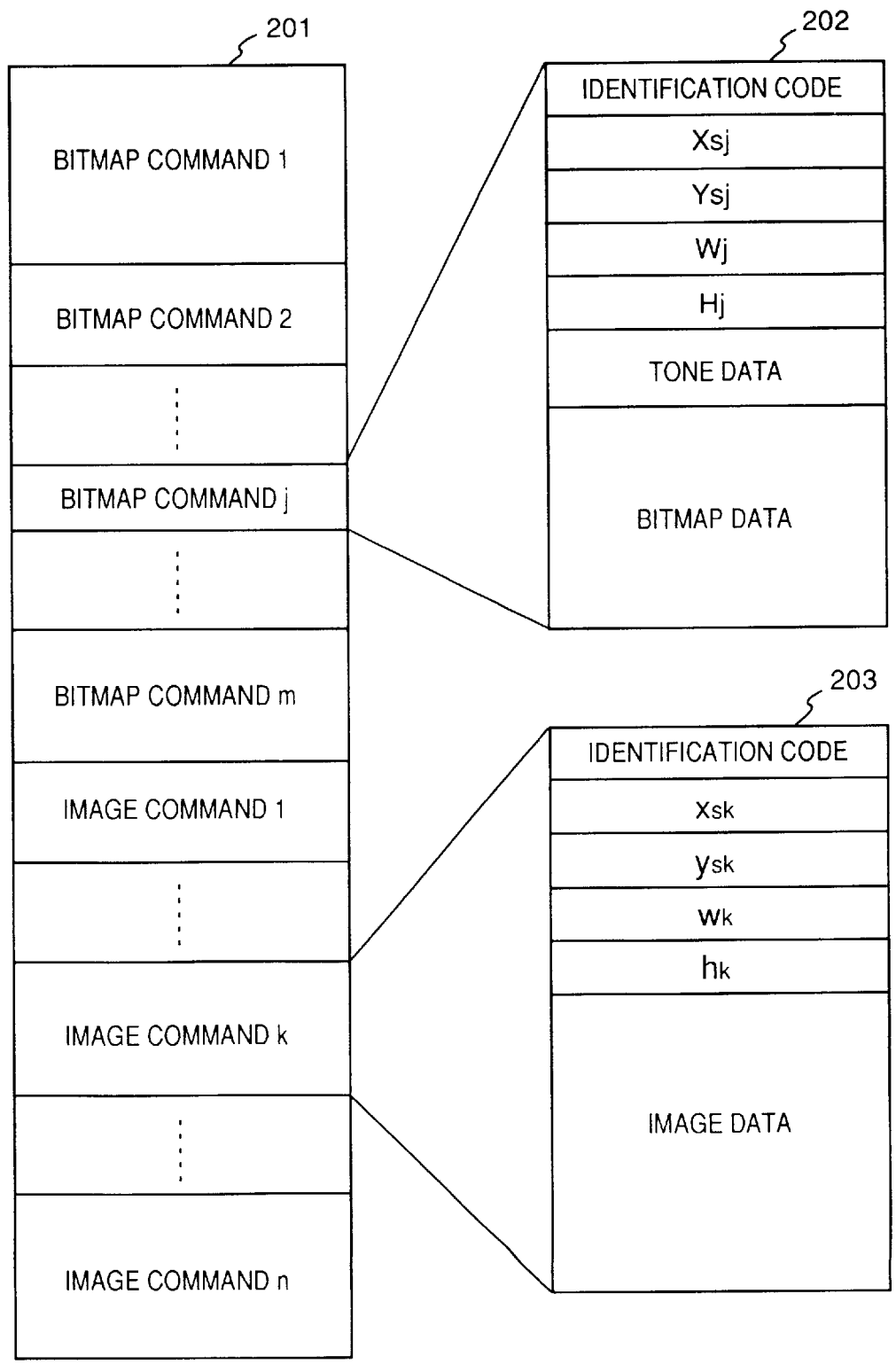
FIG. 12 is a diagram showing a command transmission format according to the fifth embodiment.

FIG. 12 is a diagram showing an example of the command transmission format in this embodiment.

In FIG. 12, numeral 201 denotes the relationship between bitmap commands and image commands, and numerals 202, 203 denote the formats of the bitmap and image commands, respectively.

In this embodiment, it is necessary that the bitmap command be received before the image command, as shown at 201, in order that the result of the extraction decision (the positional information) may be stored in the bitmap memory 109.

A j-th bitmap command indicated at 202 comprises, in the order of command structure, an identification code for identifying this command as a bitmap command, $X_{sj}$ representing a starting X coordinate of the bitmap area, $Y_{sj}$ representing a starting Y coordinate of the bitmap area, $W_j$ representing the width of the bitmap area, $H_j$ representing the height of the bitmap area, tone (color) data for painting the interior of the bitmap area, and bitmap data. Furthermore, the bitmap commands stipulate a bitmap area of rectangular shape, for example, on a page by four items of data $X_s$, $Y_s$, W, H. The bitmap data represents a paint pixel by logical "1".

A k-th image command indicated at 203 comprises, in the order of the command structure, an identification code for identifying this command as an image command, $x_{sk}$ representing a starting X coordinate of the image area, $y_{sk}$ representing a starting Y coordinate of the image area, $w_k$ representing the width of the image area, $h_k$ representing the height of the image area, and image data. Furthermore, the bitmap commands stipulate an image area of rectangular shape, for example, on a page by four items of data $x_s$, $y_s$, w, h.

Figure 13:
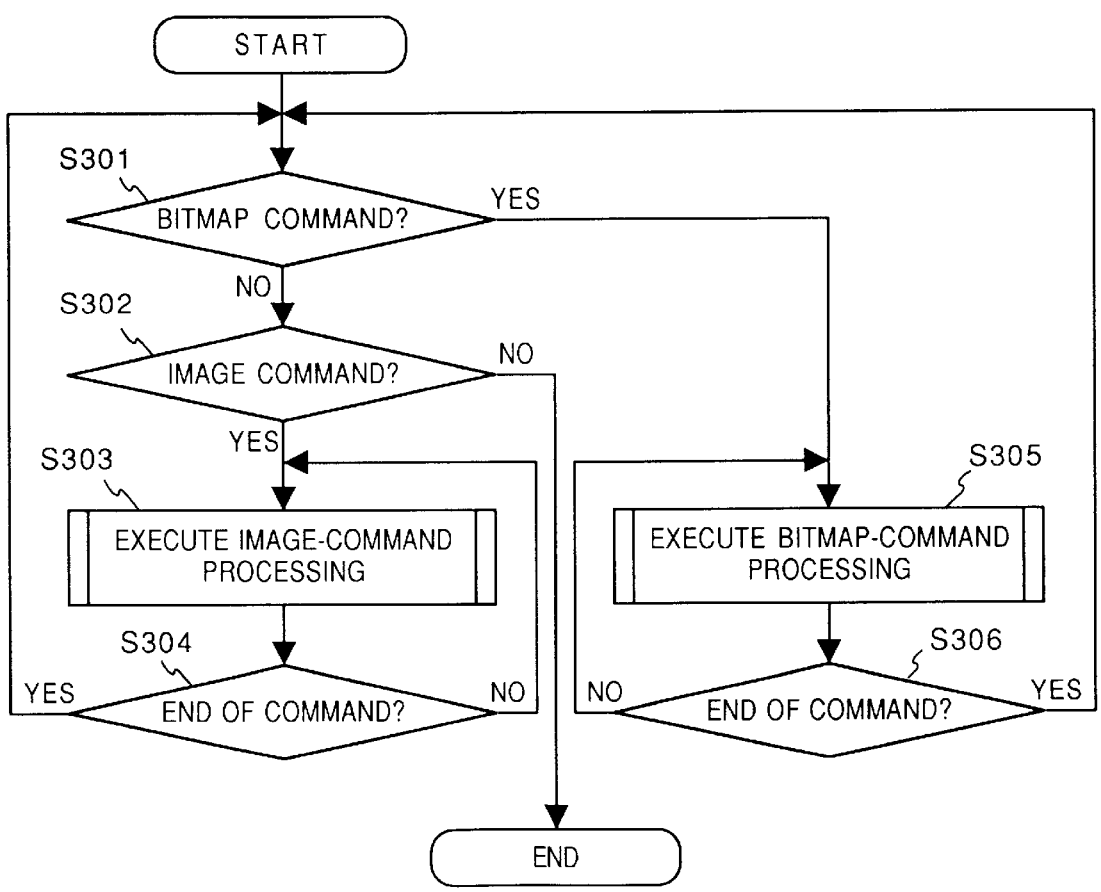
FIG. 13 is a flowchart illustrating a processing procedure according to the fifth embodiment.

FIG. 13 is a flowchart illustrating the processing procedure of this embodiment. This flowchart illustrates processing for dealing with entered commands.

According to this embodiment, step S301 of the flowchart in FIG. 13 calls for a decision as to whether entered information is a bitmap command or not. The program proceeds to step S305 if the information is a bitmap command and to step S302 if the information is not a bitmap command.

If the entered information is not a bitmap command, then it is determined at step S302 whether the entered information is an image command or not. The program proceeds to step S303 if the information is an image command, and processing is terminated if the information is not an image command.

If the entered information is a bitmap command, then bitmap-command processing is repeatedly executed from step S305 until the command is found to end at step S306. The program returns to step S301 when the command ends.

If the entered information is an image command, then image-command processing is repeatedly executed from step S303 until the command is found to end at step S304. The program returns to step S301 when the command ends.

As described above, bitmap data can be handled with a memory capacity the same as that of the conventional image processing apparatus by identifying the information entered by the command identifying circuit 102 in the format illustrated in FIG. 12. Accordingly, in accordance with this embodiment, when text data is output to a printer engine, it is unnecessary for text data to be mixed with an image in a host computer or the like. This solves the aforementioned problems encountered in the conventional image processing apparatus, namely (1) data transmission and text mixing require time, and (2) there is no compatibility with the conventional software or formatter, etc.

Further, in accordance with this embodiment, since it is unnecessary to handle image data in which text is mixed with an image, it is possible to improve upon the drawbacks of the conventional image processing apparatus, namely the decline in coding efficiency and the decline in picture quality resulting from text data that has not been extracted.

[Sixth Embodiment]

An image processing apparatus according to a sixth embodiment of the present invention will now be described. According to the sixth embodiment, the image processing apparatus receives a command having a format different from the command transmission format of the fifth embodiment shown in FIG. 10. The construction of the apparatus and the flow of processing are the same as in the fifth embodiment. These need not be described again.

Figure 14:
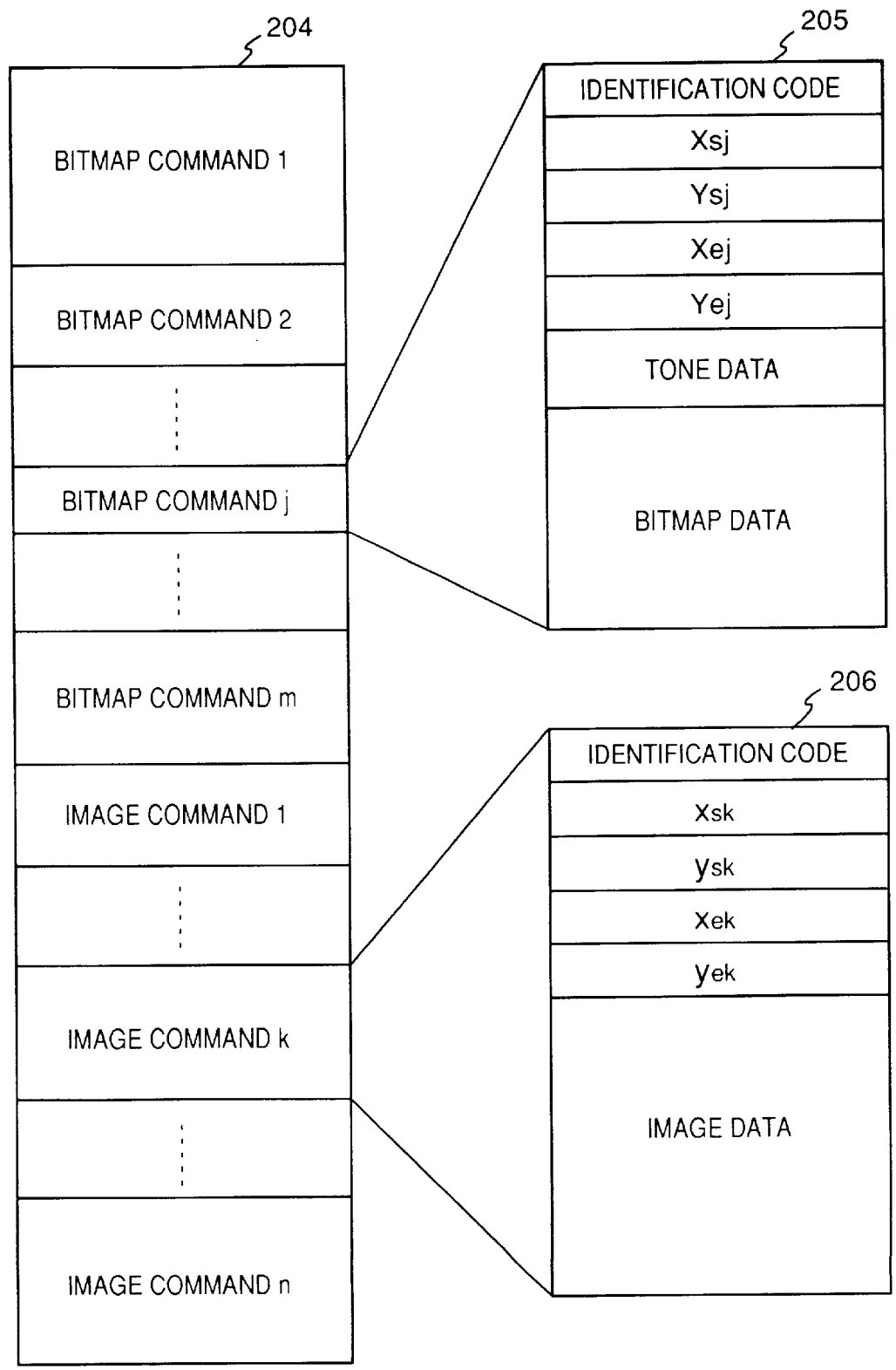
FIG. 14 is a diagram showing an example (6-1) of a command transmission format in an image processing apparatus according to a sixth embodiment of the present invention.

FIG. 14 is a diagram illustrating an example (6-1) of the command transmission format according to this embodiment.

In FIG. 14, numeral 204 denotes the relationship between bitmap commands and image commands, and numerals 205, 206 denote the formats of the bitmap and image commands, respectively.

In this embodiment, it is necessary that the bitmap command be received before the image command, as shown at 204, in order that the result of the extraction decision (the positional information) may be stored in the bitmap memory 109.

A j-th bitmap command indicated at 205 comprises, in the order of command structure, an identification code for identifying this command as a bitmap command, $X_{sj}$ representing a starting X coordinate of the bitmap area, $Y_{sj}$ representing a starting Y coordinate of the bitmap area, $X_{ej}$ representing an end X coordinate of the bitmap area, $Y_{ej}$ representing an end Y coordinate of the bitmap area, tone (color) data for painting the interior of the bitmap area, and bitmap data. Furthermore, the bitmap commands stipulate a bitmap area of rectangular shape, for example, on a page by four items of data $X_s, Y_s, X_e, Y_e$. The bitmap data represents a paint pixel by logical "1".

A k-th image command indicated at 206 comprises, in the order of the command structure, an identification code for identifying this command as an image command, $x_{sk}$ representing a starting X coordinate of the image area, $y_{sk}$ representing a starting Y coordinate of the image area, $x_{ek}$ representing an end X coordinate of the image area, and image data. Furthermore, the bitmap commands stipulate an image area of rectangular shape, for example, on a page by four items of data $x_s, y_s, x_e, y_e$.

Figure 15:
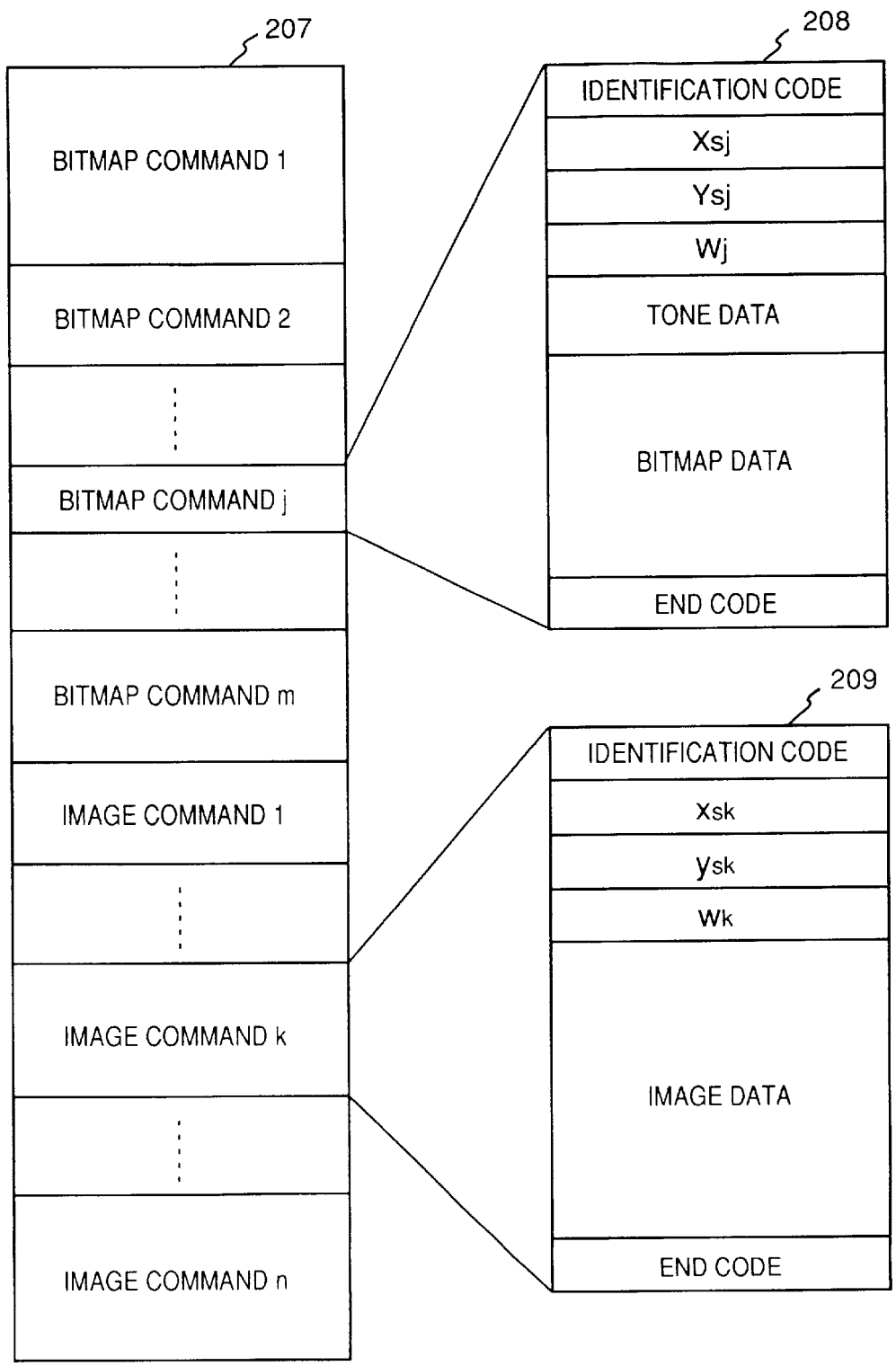
FIG. 15 is a diagram showing an example (6-2) of a command transmission format in an image processing apparatus according to the sixth embodiment.

FIG. 15 is a diagram illustrating an example (6-2) of the command transmission format according to this embodiment.

In FIG. 15, numeral 207 denotes the relationship between bitmap commands and image commands, and numerals 208, 209 denote the formats of the bitmap and image commands, respectively.

In this embodiment, it is necessary that the bitmap command be received before the image command, as shown at 207, in order that the result of the extraction decision (the positional information) may be stored in the bitmap memory 109.

A j-th bitmap command indicated at 208 comprises, in the order of command structure, an identification code for identifying this command as a bitmap command, $X_{sj}$ representing a starting X coordinate of the bitmap area, $W_j$ representing the width of the bitmap area, tone (color) data for painting the interior of the bitmap area, bitmap data and an end code. Furthermore, the bitmap data represents a paint pixel by logical "1".

A k-th image command indicated at 209 comprises, in the order of command structure, an identification code for identifying this command as an image command, $x_{sk}$ representing a starting X coordinate of the image area, $y_{sk}$ representing a starting Y coordinate of the image area, $w_k$ representing the width of the image area, image data and an end code.

The bitmap area and image area can both be determined if the starting coordinates of the areas, the widths of the areas and the end of the data are known. In other words, data in an amount corresponding to the width of an area is stored in memory successively from the starting coordinates of the area, and the area is terminated at the moment the end code is received.

Accordingly, with the format of example (6-2), $H_j$ and $h_k$ representing the heights of the areas are unnecessary. However, it is necessary to prevent a data string the same as that of the end code from appearing in the bitmap data and image data.

A method (hereinafter referred to as "byte stuffing") of preventing a data string the same as that of the end code from appearing in the data in a case where a command having the transmission format of example (6-2) is received will now be described.

FIGS. 16A, 16B and 16C are diagrams for an describing example of byte stuffing.

By way of example, assume that a data string the same as that of an end code has appeared in bitmap data or image data, as shown in FIG. 16A, in a case where the end code in this embodiment is composed of two bytes "1B", "45".

In this case, an external host computer or the like inserts a prescribed code between the codes "1B" and "45" so that "1B""45" will not be identified as an end code. The inserted code may be any code other than the second byte of the end code. In the above-mentioned example, it will suffice to insert a code other than "45". An example will be described below in which "00" is adopted as the inserted code.

Specifically, the external host computer or the like inserts "00" between the codes "1B" and "45" in the data string shown in FIG. 16A and changes the code "1B""00" in the data prior to byte stuffing to the code "1B""00""00" to obtain the data string shown in FIG. 16B.

In this embodiment, when the data string shown in FIG. 16B is received, one of the "00"s following the code "1B" is eliminated in the data separating circuits (a) 103 and (b) 105 illustrated in FIG. 10. Accordingly, the data string shown in FIG. 16C is output by the data separating circuits (a) 103 and (b) 105 to restore the data (FIG. 16A) that prevailed prior to byte stuffing.

In this embodiment, the same effects can be obtained by adding an end code to the end of the data even in a case where the end X coordinates $X_e, x_e$ of the areas are used instead of the widths W, w of the areas.

Figure 17:
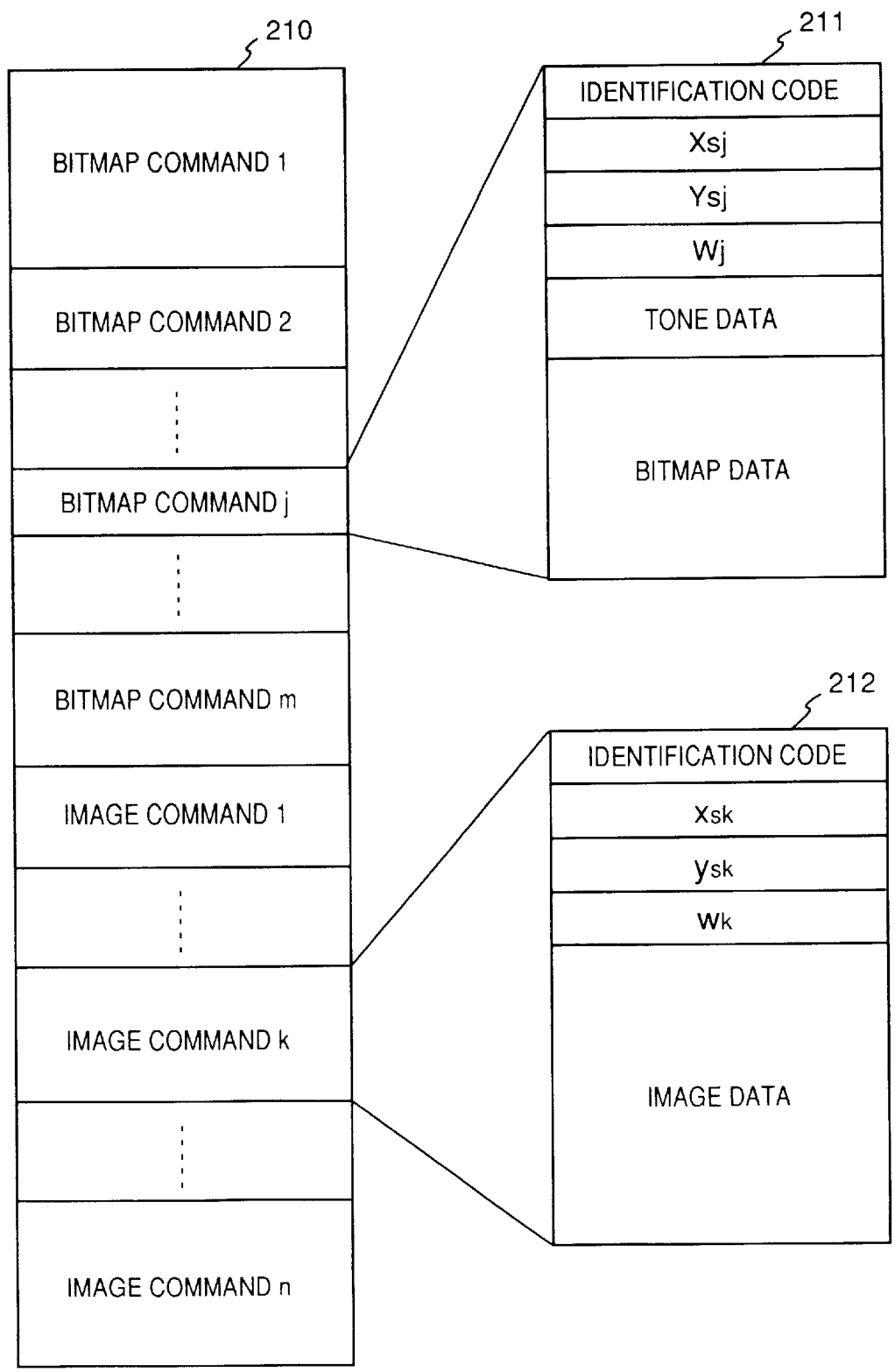
FIG. 17 is a diagram showing an example (6-3) of a command transmission format in an image processing apparatus according to the sixth embodiment.

FIG. 17 is a diagram showing an example (6-3) of a command transmission format in this embodiment.

In FIG. 17, numeral 210 denotes the relationship between bitmap commands and image commands, and numerals 211, 212 denote the formats of the bitmap and image commands, respectively.

In this embodiment, it is necessary that the bitmap command be received before the image command, as shown at 210, in order that the result of the extraction decision (the positional information) may be stored in the bitmap memory 109.

A j-th bitmap command indicated at 211 comprises, in the order of command structure, an identification code for identifying this command as a bitmap command, $X_{sj}$ representing a starting X coordinate of the bitmap area, $W_j$ representing the width of the bitmap area, tone (color) data for painting the interior of the bitmap area, and bitmap data. Furthermore, the bitmap data represents a paint pixel by logical "1".

A k-th image command indicated at 212 comprises, in the order of command structure, an identification code for identifying this command as an image command, $x_{sk}$ representing a starting X coordinate of the image area, $y_{sk}$ representing a starting Y coordinate of the image area, $w_k$ representing the width of the image area, and image data.

The bitmap area and image area can both be determined if the starting coordinates of the areas, the widths of the areas and the end of the data are known. In other words, data in an amount corresponding to the width of an area is stored in memory successively from the starting coordinates of the area, and the area is terminated at the moment the end code is received.

Accordingly, with the format of example (6-3), $H_j$ and $h_k$, which represent the heights of the areas, and the end codes are unnecessary. However, it is necessary to prevent a data string the same as that of the identification code from appearing in the bitmap data and image data.

Accordingly, byte stuffing of this embodiment, in which the format of example (6-3) is received, is required to be carried out with regard to three codes, namely the identification code (e.g., "1B""42") of the bitmap command, the image-command identification code (e.g., "1B""50") and a stuffing-processing detecting code (e.g., "1B""00").

Figure 18A:
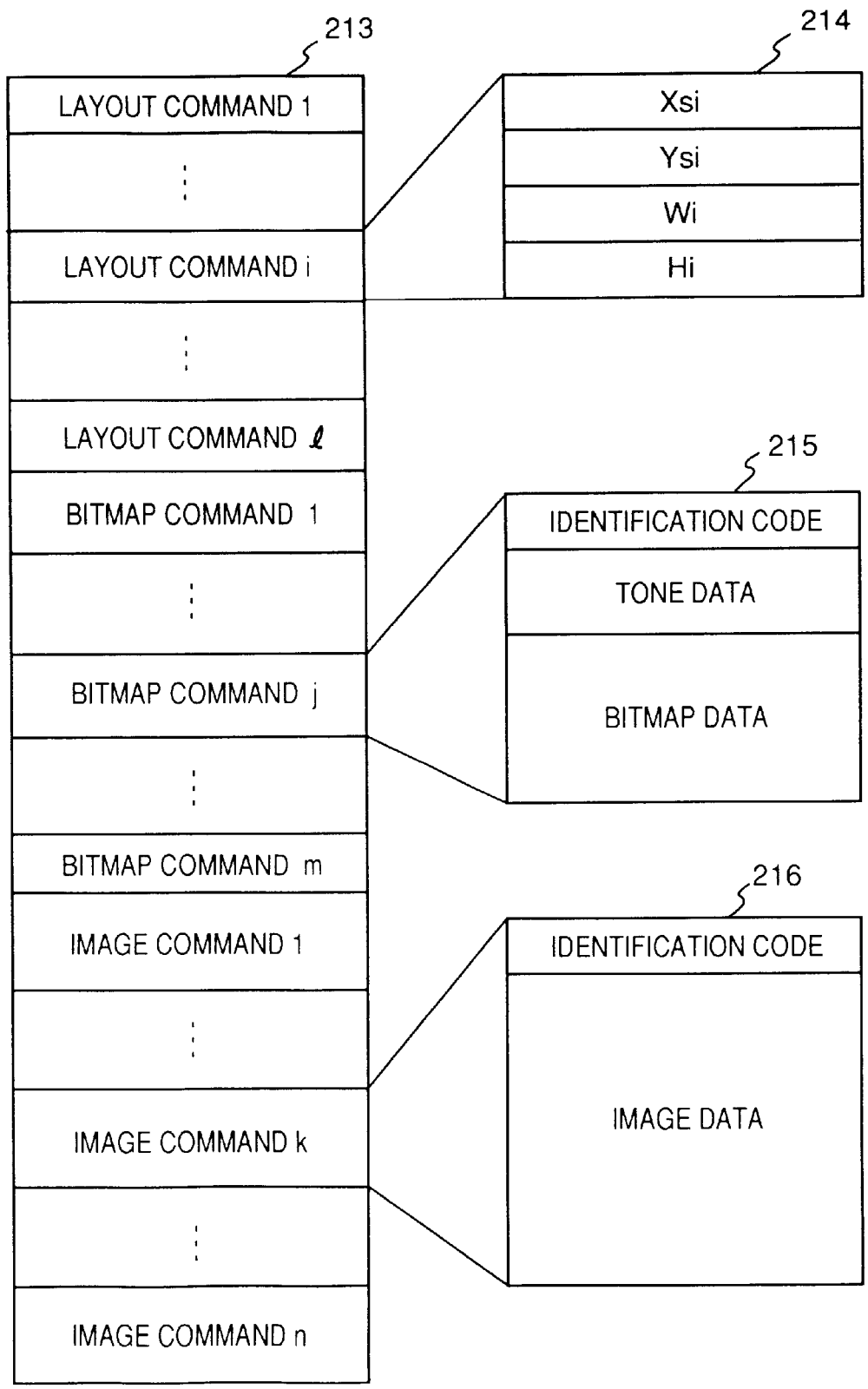
FIG. 18A is a diagram showing an example (6-4) of a command transmission format in an image processing apparatus according to the sixth embodiment.

FIG. 18A is a diagram showing an example (6-4) of a command transmission format in this embodiment.

In FIG. 18A, numeral 213 denotes the format of the overall commands, and numerals 214, 215, 216 denote the formats of individual commands.

In this embodiment, the area-information portions of the bitmap commands and image commands described in the fifth embodiment are separated, a layout command of the kind indicated at 214 in FIG. 18A is constructed and this layout command is placed at the beginning of the transmission data. Furthermore, and by way of example, the layout commands are arranged in the order of the data transmitted, and the number of commands is equal to the total number of items of bitmap data and image data.

An i-th layout command shown at 214 comprises, in the order of the command structure, $X_{si}$ representing the starting X coordinate of the area, $Y_{si}$ representing the starting Y coordinate of the area, and $H_i$ representing the height of the area.

A j-th bitmap command shown at 215 comprises, in the order of the command structure, an identification code for identifying this command as a bitmap command, tone (color) data for painting the interior of the bitmap area, and bitmap data. The bitmap data represents a paint pixel by "1".

A k-th image command shown at 216 comprises, in the order of the command structure, an identification code for identifying this command as an image command, and image data.

In this embodiment, the identification code is set to a code that corresponds to an area outside the allowable limits of the layout command $X_s$ in order that the identification code received immediately after the end of all layout commands will not be identified as the layout command $X_s$.

Figure 18B:
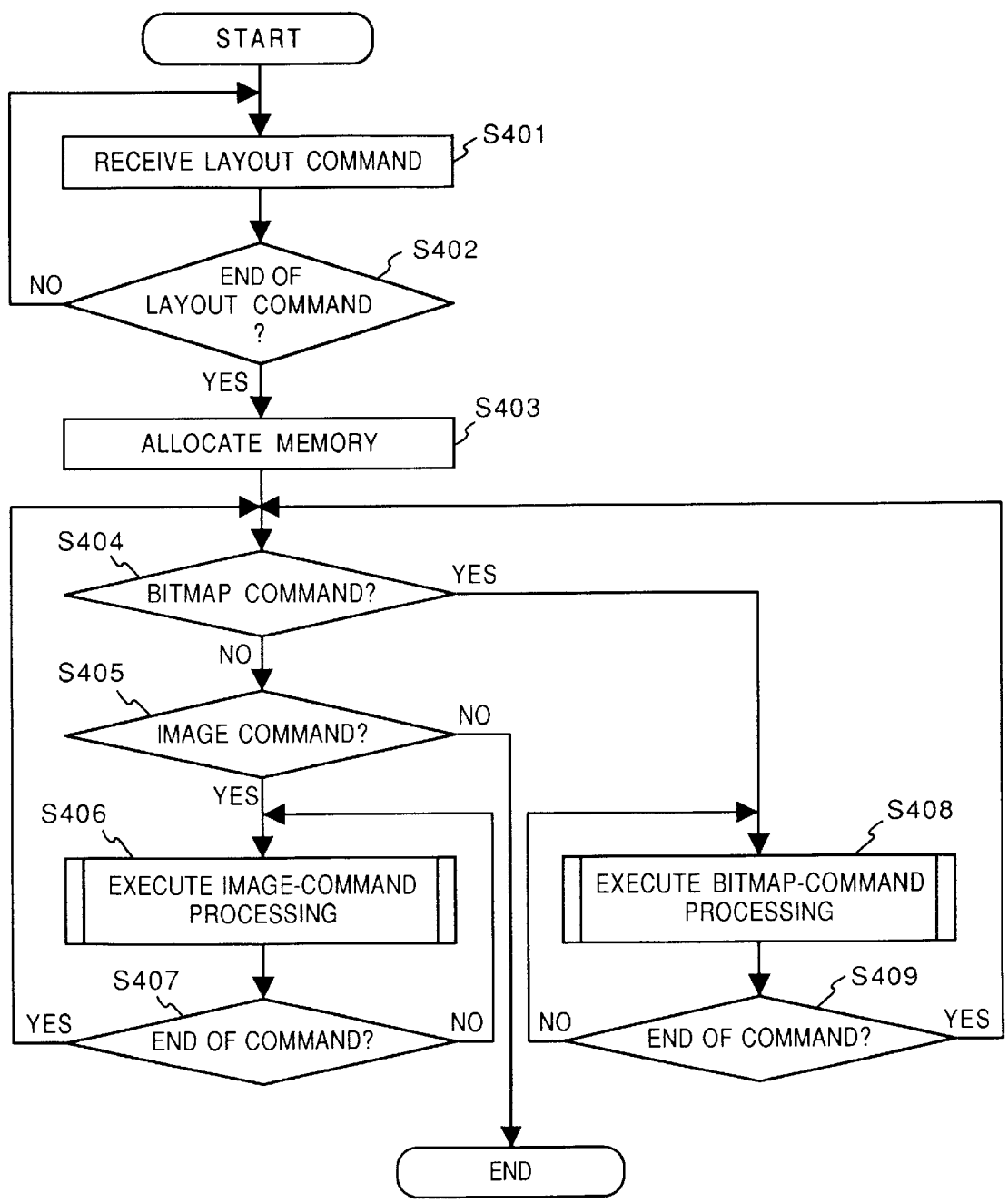
FIG. 18B is a flowchart showing a procedure for processing the command transmission format of the example (6-4)

FIG. 18B is a flowchart illustrating the procedure through which the command transmission format of example (6-4) is processed.

At step S401 in the flowchart of FIG. 18B according to this embodiment, the layout command is received, after which it is determined at step S402 whether the layout command has ended. The program proceeds to step S403 if the layout command has ended and returns to step S401 if it has not ended. It should be noted that the layout command is judged to have ended when the identification data of the bitmap command or image command has been received.

If the layout command has ended in this embodiment, then the required storage areas are obtained in the bitmap memory 109 and block-tone memory 111 in accordance with the received layout data, and the remaining areas in the bitmap memory 109 and block-tone memory 111 are allocated to the image memory 113 at step S403.

Next, step S404 calls for a decision as to whether entered information is a bitmap command or not. The program proceeds to step S408 if the information is a bitmap command and to step S405 if the information is not a bitmap command.

If the entered information is not a bitmap command, then it is determined at step S405 whether the entered information is an image command or not. The program proceeds to step S406 if the information is an image command, and processing is terminated if the information is not an image command.

If the entered information is a bitmap command, then bitmap-command processing is repeatedly executed from step S408 until the command is found to end at step S409. The program returns to step S404 when the command ends.

If the entered information is an image command, then image-command processing is repeatedly executed from step S406 until the command is found to end at step S407. The program returns to step S404 when the command ends.

Thus, when a layout command is received according to this embodiment, the required areas in the bitmap memory 109 and block-tone memory 111 are obtained in accordance with the layout data, and the remaining areas of the bitmap memory 109 and block-tone memory 111 are allocated to the image memory 113. As a result, the memory capacity of the image memory 113 can be increased so that coding/decoding can be performed with little deterioration in picture quality.

Figure 19A:
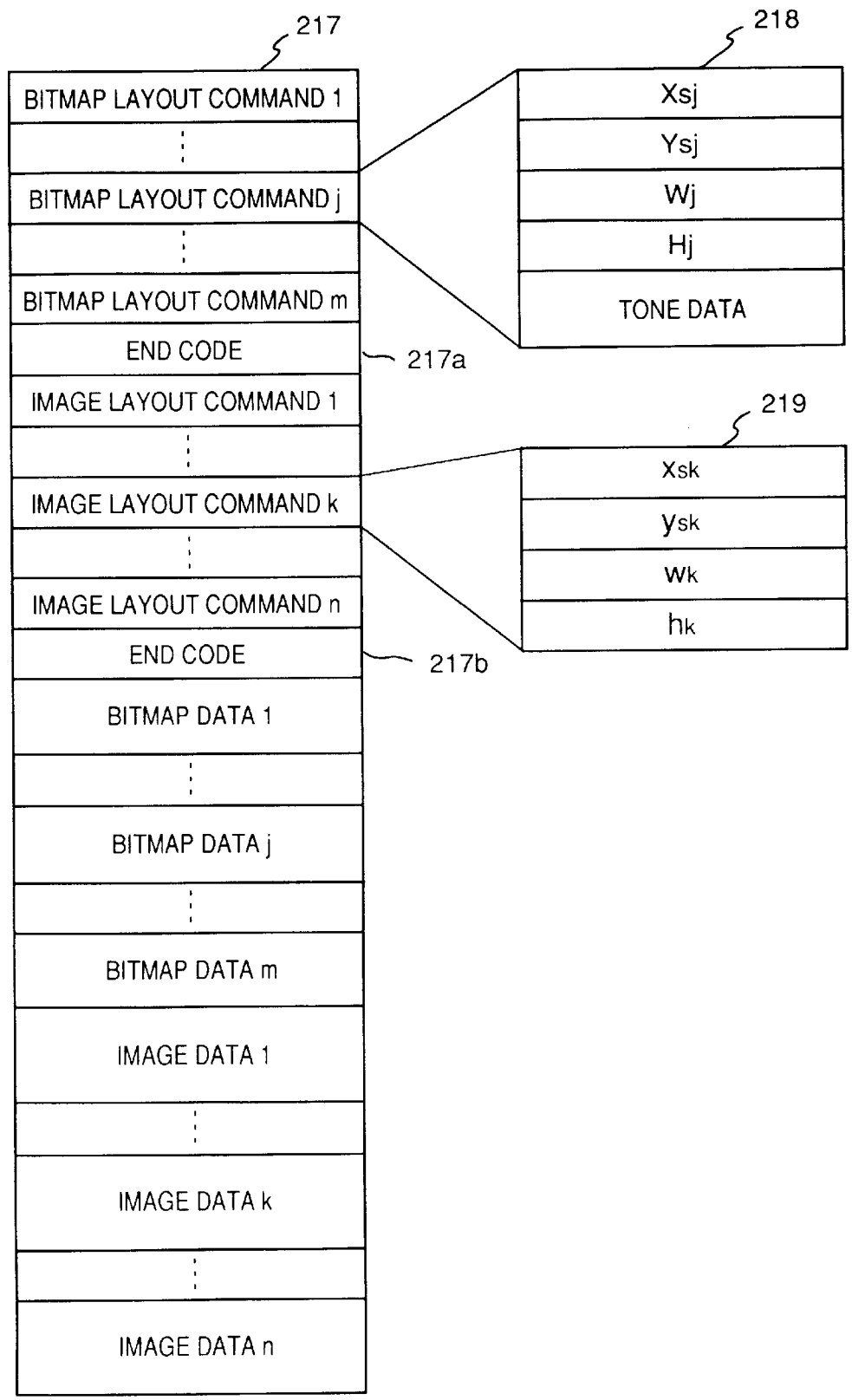
FIG. 19A is a diagram showing an example (6-5) of a command transmission format in an image processing apparatus according to the sixth embodiment.

FIG. 19A is a diagram showing an example (6-5) of a command transmission format in this embodiment.

In FIG. 19A, numeral 217 denotes the format of the overall commands, and numerals 218, 219 denote the formats of individual commands.

In this embodiment, the layout command shown in FIG. 18A is separated into the layout command for the bitmap shown at 218 and the layout command for the image shown at 219 in FIG. 19A, and the layout command for the bitmap is put into a format that contains tone data. Furthermore, and by way of example, the layout commands are arranged in the order of the data transmitted, and the number of layout commands is equal to the total number of items of bitmap data and image data.

A j-th layout command for the bitmap shown at 218 comprises, in the order of the command structure, $X_{sj}$ representing the starting X coordinate of the area, $Y_{sj}$ representing the starting Y coordinate of the area, $W_j$ representing the width of the area, $H_j$ representing the height of the area, and tone (color) data. An end code indicated at 217a is added on after the transmission of all of the bitmap layout commands.

A k-th layout command for the bitmap shown at 219 comprises, in the order of the command structure, $x_{sk}$ representing the starting X coordinate of the area, $y_{sk}$ representing the starting Y coordinate of the area, $w_k$ representing the width of the area, and $h_k$ representing the height of the area. An end code indicated at 217b is added on after the transmission of all of the image layout commands. The end code is set to a code that corresponds to an area outside the allowable limits of $X_s$ in order that the code received immediately after the end of all layout commands will not be identified as the end code.

Bitmap data, the number of items of which is equal to the number of bitmap layout commands, is placed after the end code 217b, and this is followed by the image data, the number of items of which is equal to the number of image layout commands.

Figure 19B:
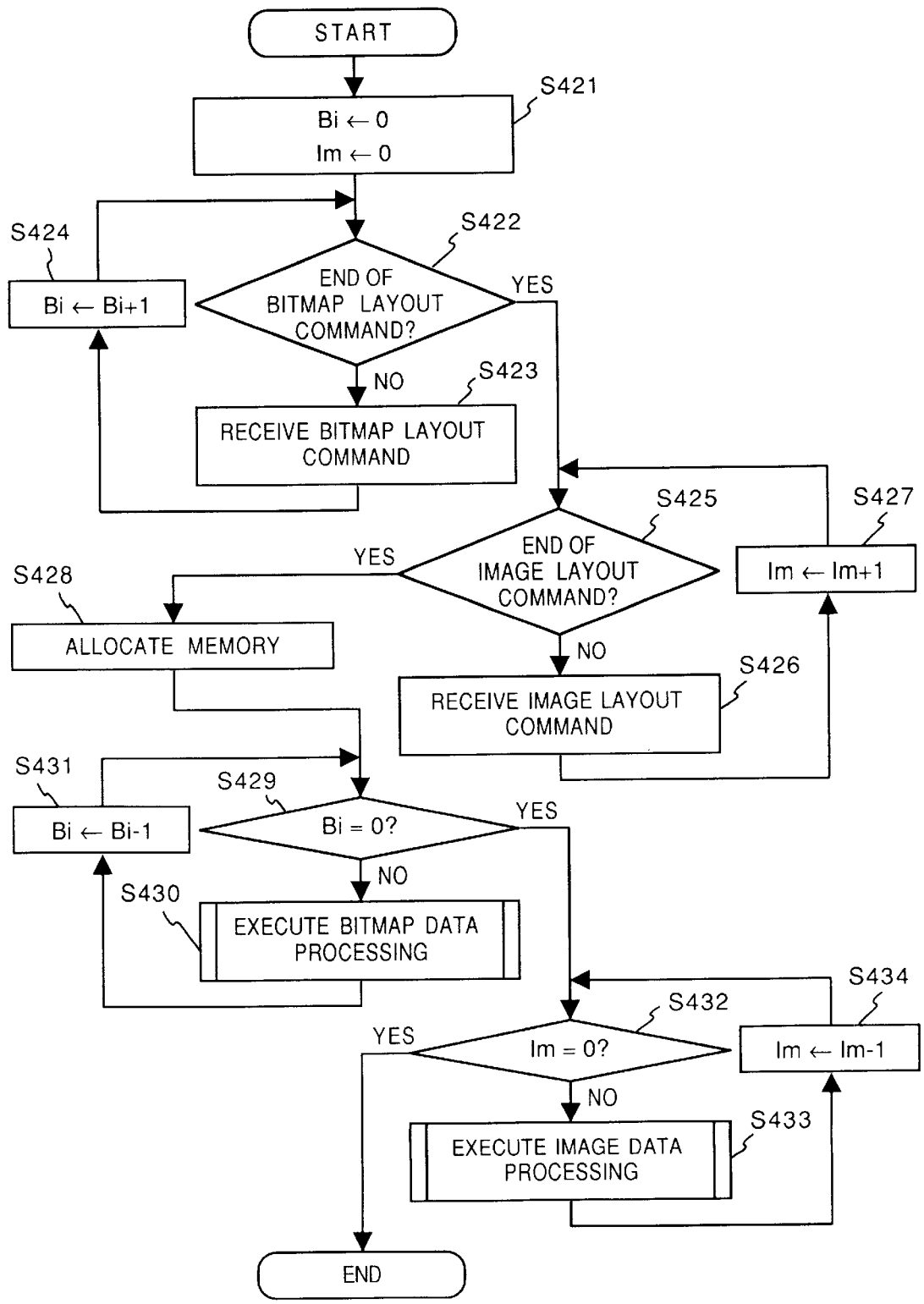
FIG. 19B is a flowchart showing a procedure for processing the command transmission format of example (6-5)

FIG. 19B is a flowchart illustrating the procedure through which the command transmission format of example (6-5) is processed.

At step S421 in the flowchart of FIG. 19B according to this embodiment, variables Bi, Im are initialized to zero, after which it is determined at step S422 whether the bitmap layout command has ended. The program proceeds to step S425 if the command has ended. If the command has not ended, the program proceeds to step S423, at which the bitmap layout command is received. This is followed by step S424, at which the variable Bi is incremented before the program returns to step S422. The judgment as to whether the bitmap layout command has ended is made based upon whether the end code 217a has been received.

If the bitmap layout command has ended, in this embodiment it is determined at step S425 whether the image layout command has ended. The program proceeds to step S428 if the command has ended. If the command has not ended, the program proceeds to step S426, at which the image layout command is received. This is followed by step S427, at which the variable Im is incremented before the program returns to step S425. The judgment as to whether the image layout command has ended is made based upon whether the end code 217b has been received.

If the image command has ended in this embodiment, then the area required for the bitmap data is obtained in the bitmap memory 109 and the area required for the paint-tone data is obtained in the block-tone memory 111 in accordance with the received layout data, and the remaining areas in the bitmap memory 109 and block-tone memory 111 are allocated to the image memory 113 at step S428.

Next, the variable Bi is judged at step S429. If Bi=0 holds, then the program proceeds to step S432. If B>0 holds, bitmap data processing is executed at step S430, the variable Bi is decremented at step S431 and the program returns to step S429.

If Bi=0 holds, the variable Im is judged at step S432. If Im=0 is found to hold, processing is terminated. If Im>0 holds, image data processing is executed at step S433 and the variable Im is decremented at step S434, after which the program returns to step S432.

When a layout command is received according to this embodiment, the area required for the bitmap data is obtained in the bitmap memory 109 and the area required for the paint-tone data is obtained in the block-tone memory 111 in accordance with the layout data, and the remaining areas in the bitmap memory 109 and block-tone memory 111 are allocated to the image memory 113. As a result, the memory capacity of the image memory 113 can be increased so that coding/decoding can be performed with little deterioration in picture quality.

When all of the layout commands have been received in this embodiment, the areas that have been obtained in the bitmap memory 109 and block-tone memory 111 can be determined. Accordingly, with the command transmission format of example (6-5) shown in FIG. 19A, a more appropriate memory allocation can be made in comparison with that made using the command transmission format of example (6-4).

By way of example, if S represents the total amount of memory and E the total number of pixels in the designated area, and if the number of tones per pixel is 24 bits (or 8 bits×3 colors), then the amount P of image memory allocation will be expressed by the following equation:

$$P = S - E\left(1 + \frac{24}{8 \times 8}\right) \quad (1)$$

where this is for a case where one block is composed of 8×8 pixels.

If it is assumed that there is no overlapping of image areas, the amount Pk of allocation of the image area k will be expressed by the following equation:

$$Pk = \frac{P}{\sum_{k=1}^{n} Wk \cdot hk} \cdot wk \cdot hk \quad (2)$$

Accordingly, in this embodiment, the amount of allocation of each image area can be determined in advance. Therefore, if memory allocation is performed for every image area in advance based upon the position of the image area, this will make it possible to simplify control of the image memory 113, at the time of decoding, by the memory controller (b) 112 in FIG. 10.

Furthermore, if there is no bitmap data in this embodiment, the end code is transmitted at the beginning and then the image layout command is transmitted.

If the layout commands are arranged in a preset transmission order in this embodiment, either the bitmap layout command or image layout command may be transmitted ahead of the other.

Further, according to this embodiment, an identification code may be added to the beginning of the layout command instead of an end code. In a case where the identification code is added, it is possible to identify, based upon the identification code, whether a command is a bitmap layout command or an image layout command. This means that there is absolutely no limitation upon the order of transmission.

In accordance with this embodiment, as described above, effects similar to those of the fifth embodiment can be obtained. Moreover, in accordance with the format of example (6-1) shown in FIG. 14, the end coordinates of the area are incorporated in the command, thereby facilitating the processing associated with the command.

In accordance with the format of example (6-2) shown in FIG. 15, an end code of a command is incorporated in the command, thereby facilitating the processing associated with the command.

In accordance with the format of example (6-3) shown in FIG. 17, the command format can be simplified since it is unnecessary to incorporate data representing the height of an area and an end code of a command in the command.

In accordance with the format of example (6-4) shown in FIG. 18A, the overall layout can be known from the layout command before the bitmap data or image data is received. As a result, memory allocation of the bitmap memory, block-tone memory and image memory can be optimized, and remaining memory can be allocated to the image memory. This makes it possible to perform coding/decoding of image data with little deterioration in picture quality.

With the format of example (6-5) shown in FIG. 19A, effects similar to those of the format of example (6-4) are obtained. Moreover, since commands are separated into bitmap layout commands and image layout commands, the areas obtained in the bitmap memory and block-tone memory can be determined when all of the layout commands are received. Accordingly, with the format of example (6-5), a more appropriate memory allocation can be made in comparison with that made using the command transmission format of example (6-4). Furthermore, since a large amount of remaining memory can be allocated to the image memory, coding/decoding of image data can be performed with little deterioration in picture quality.

[Seventh Embodiment]

An image processing apparatus according to a seventh embodiment of the present invention will now be described. Elements in the seventh embodiment approximately the same as those of the fifth embodiment will be designated by like reference characters and need not be described again.

FIG. 20 is a block diagram illustrating the configuration of the image processing apparatus according to the seventh embodiment.

As shown in FIG. 20, a data identification signal for identifying the layout information and data portion of each command is applied to an input terminal 141 from an external device such as a host computer or formatter (not shown).

On the basis of a command changeover code, described below, contained in the information input via the terminal 101, a command identification circuit 142 identifies whether the information is a bitmap command or an image command, outputs information identified as being the bitmap command to a data separating circuit (b) 145 and outputs information identified as being an image command to a data separating circuit (a) 143.

On the basis of the data identification signal input via the terminal 141, the data separating circuit (b) 145 separates the bitmap command from the command identifying circuit 142 into layout information, paint-tone (color) data and bitmap data. The data separating circuit (b) 145 outputs the separated layout information to memory controller (a) 110, outputs the separated bitmap data to the bitmap memory 109, and outputs the paint-tone (color) data to the block-tone memory 111.

On the basis of the data identification signal input via the terminal 141, the data separating circuit (a) 143 separates the image command from the command identifying circuit 142 into layout information and image data, outputs the separated layout information to the block forming circuit 104, the memory controller (a) 110 and the decoding circuit 114, and outputs the separated image data to the block forming circuit 104.

In other aspects the construction of the apparatus and the flow of processing in this embodiment are the same as in the fifth embodiment. These need not be described again.

Figure 21:
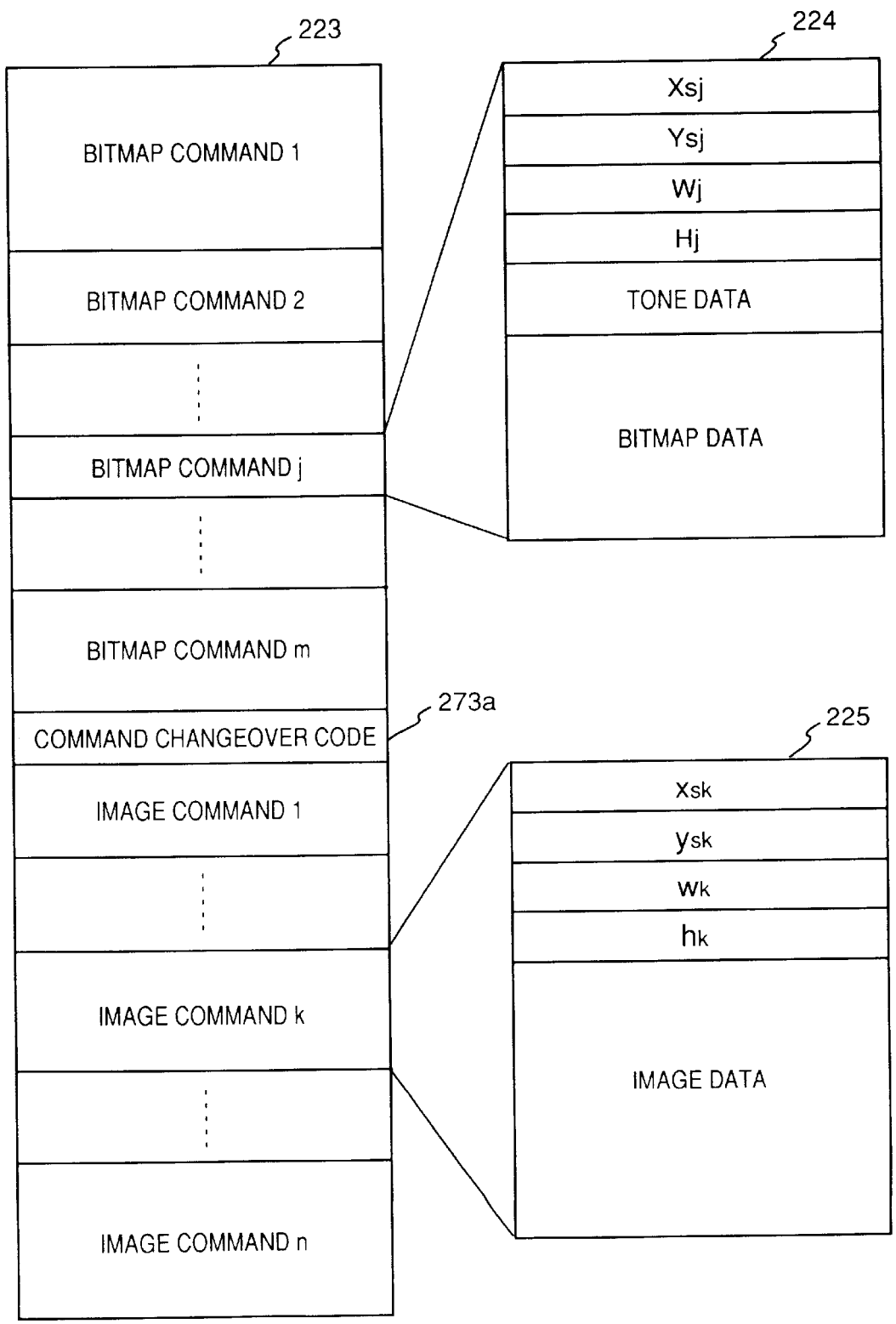
FIG. 21 is a diagram showing an example (7-1) of a command transmission format in an image processing apparatus according to the seventh embodiment.

FIG. 21 is a diagram illustrating an example (7-1) of the command transmission format according to this embodiment.

In FIG. 21, numeral 223 denotes the relationship between bitmap commands and image commands, and numerals 224, 225 denote the formats of the bitmap and image commands, respectively.

The transmission format of this embodiment has a structure obtained by deleting the identification command from the transmission format of FIG. 5 shown in FIG. 12 and adding a command changeover command 273a. More specifically, in this embodiment, the beginning of the command can be identified by the above-mentioned data identification signal. This makes it unnecessary to include an identification code at the beginning of each command. Further, in this embodiment, the start of an image command is identified by inserting the command changeover code 273a at the end of a series of bitmap commands. It should be noted that the command changeover code is set to a code that corresponds to an area outside the allowable limits of $X_s$.

Figure 22:
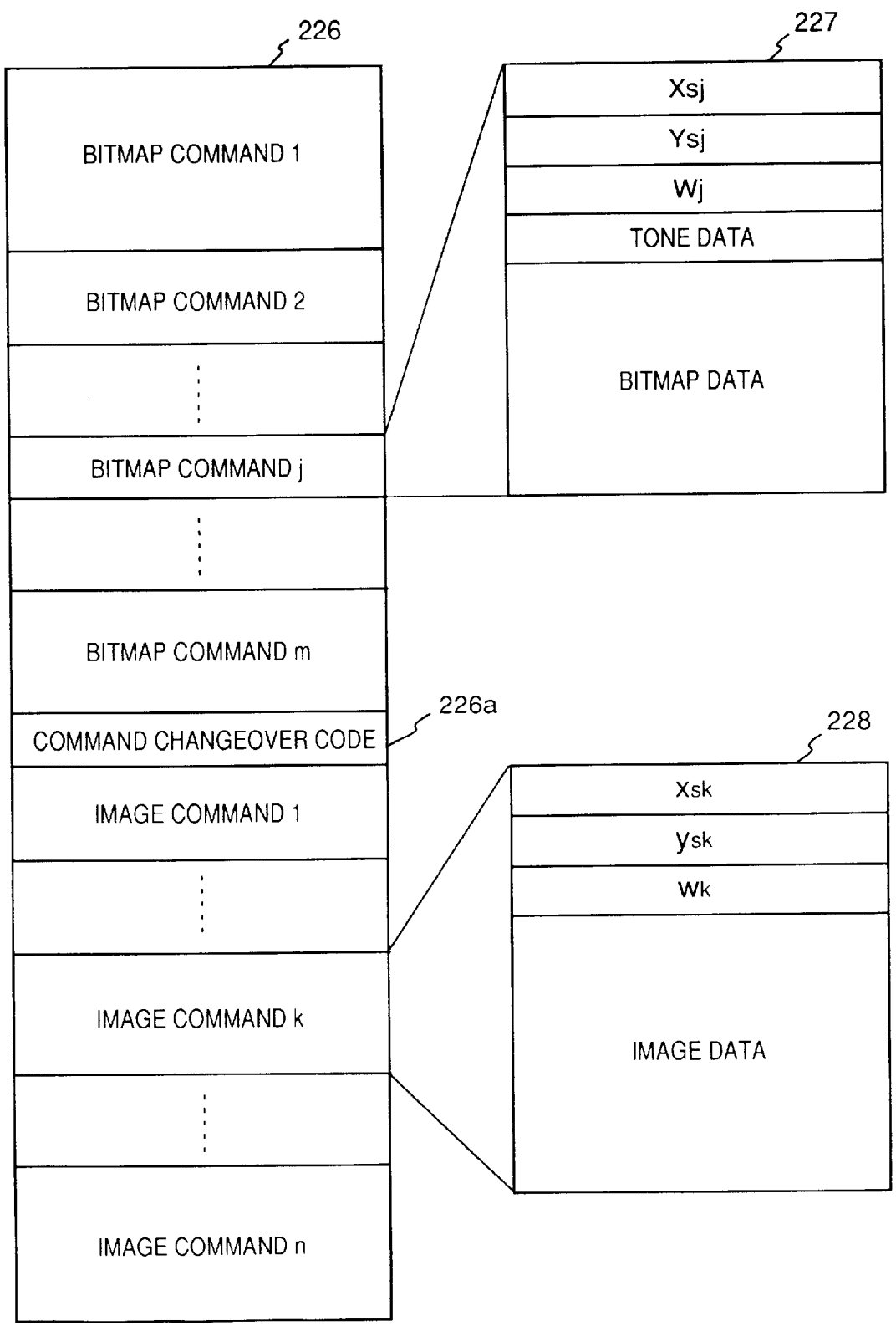
FIG. 22 is a diagram showing an example (7-2) of a command transmission format in an image processing apparatus according to the seventh embodiment.

FIG. 22 is a diagram illustrating an example (7-2) of the command transmission format according to this embodiment.

In FIG. 22, numeral 226 denotes the relationship between bitmap commands and image commands, and numerals 227, 228 denote the formats of the bitmap and image commands, respectively.

As shown in FIG. 22, the transmission format of example (7-2) has a structure obtained by deleting H and h representing the heights of the areas from the transmission format of example (7-1) shown in FIG. 21. More specifically, in this embodiment, the end of each command can be judged by the data identification signal, and therefore the area can be determined from the starting coordinates of the area and the width of the area.

In accordance with this embodiment, as described above, effects similar to those of the fifth embodiment can be obtained. Moreover, the break between the layout information and data portion can be determined based upon the data identification signal and command changeover code. As a result, in accordance with the format of example (7-1) shown in FIG. 21, an identification code or the like need not be incorporated in a command. This makes it possible to simplify the command transmission format.

Further, the end of each command can be determined based upon the data identification signal. In accordance with the format of example (7-2) of FIG. 22, therefore, it is unnecessary to include information representing the height of an area in a command. This makes it possible to simplify the command transmission format even further.

[Eighth Embodiment]

An image processing apparatus according to an eighth embodiment of the present invention will now be described. The apparatus of the eighth embodiment receives a command whose format differs from the command transmission format of the seventh embodiment illustrated in FIGS. 21 and 22. Elements in the apparatus of the eighth embodiment similar to those of the seventh embodiment will be designated by like reference characters and need not be described in detail again.

Figure 23:
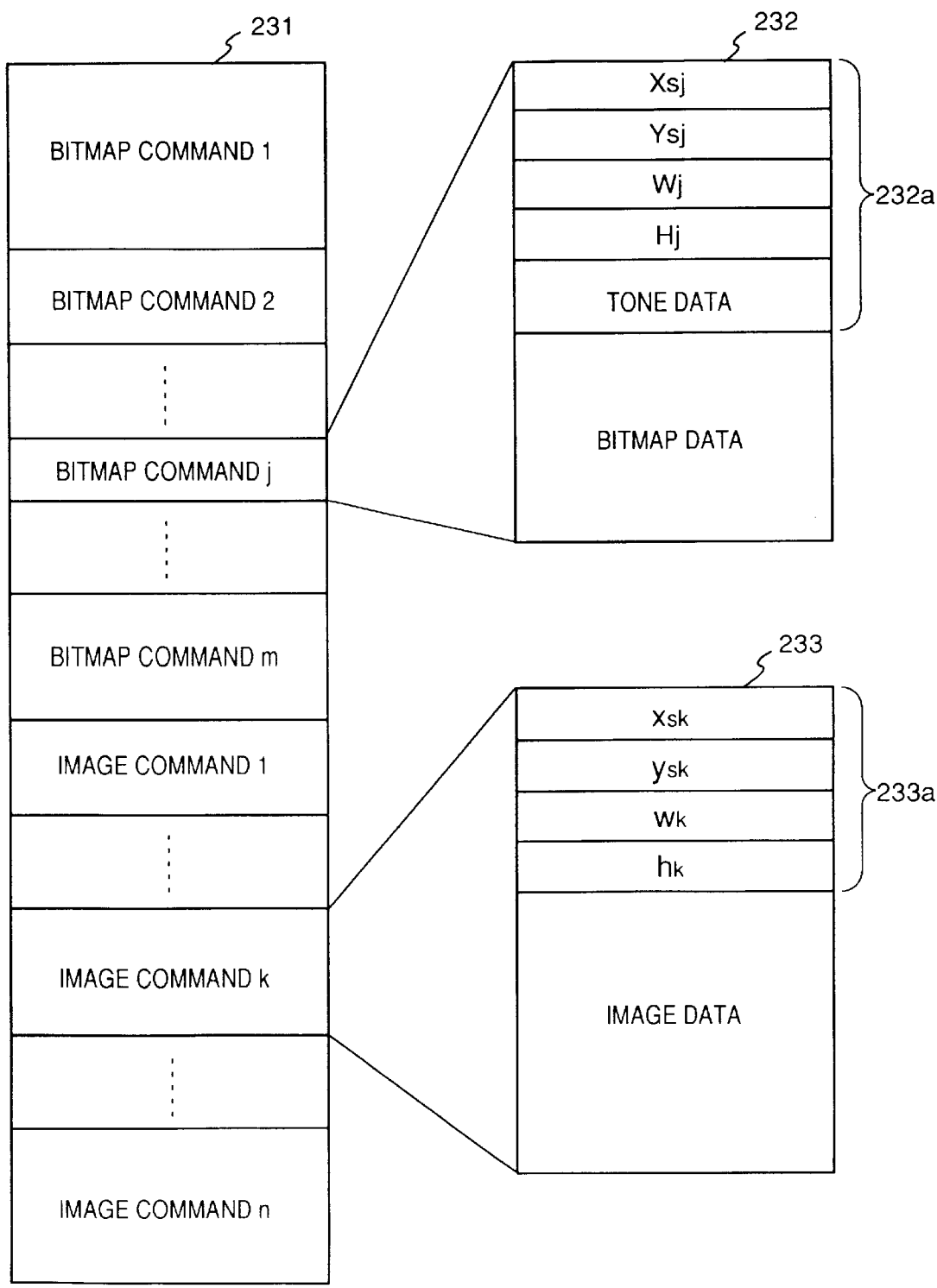
FIG. 23 is a diagram showing an example (8-1) of a command transmission format in an image processing apparatus according to an eighth embodiment of the present invention.

FIG. 23 is a diagram illustrating an example (8-1) of the command transmission format according to the eighth embodiment.

In FIG. 23, numeral 231 denotes the relationship between bitmap and image commands, and numerals 232, 233 denote the formats of the bitmap and image commands, respectively.

As shown in FIG. 23, in this embodiment the bitmap and image commands are identified by respective headers 232a, 233a of these commands.

In this embodiment, assume that the starting X coordinate, the starting Y coordinate, the width of the area and the height of the area are each represented by two bytes, and that tone data is represented by three bytes, by way of example. In such case, the header 232a of the bitmap command will be a total of 11 bytes and the header 233a of the image command will be a total of eight bytes. Accordingly, the bitmap and image commands can be identified by counting the amount of information in the headers of the commands.

Figure 24:
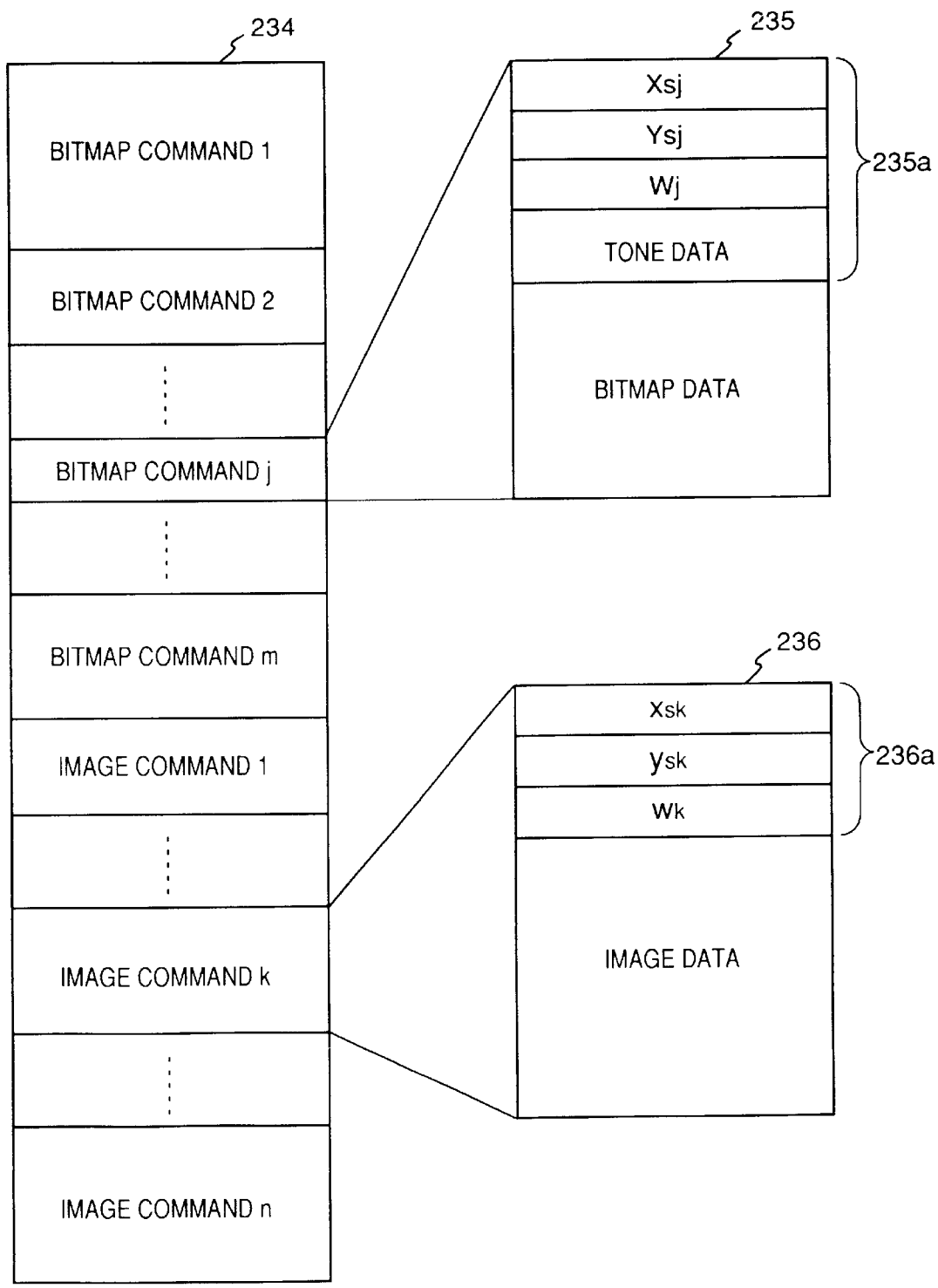
FIG. 24 is a diagram showing an example (8-2) of a command transmission format according to the eighth embodiment.

FIG. 24 is a diagram illustrating an example (8-2) of the command transmission format according to the eighth embodiment.

In FIG. 24, numeral 234 denotes the relationship between bitmap and image commands, and numerals 235, 236 denote the formats of the bitmap and image commands, respectively.

As in example (8-2) of the seventh embodiment illustrated in FIG. 22, in this embodiment also an area can be determined by the above-mentioned data identification circuit without information representing area height. Accordingly, the format of example (8-2) shown in FIG. 24 has a structure from which H, h representing the heights of the areas have been deleted from the format of example (8-1) shown in FIG. 23.

Figure 25:
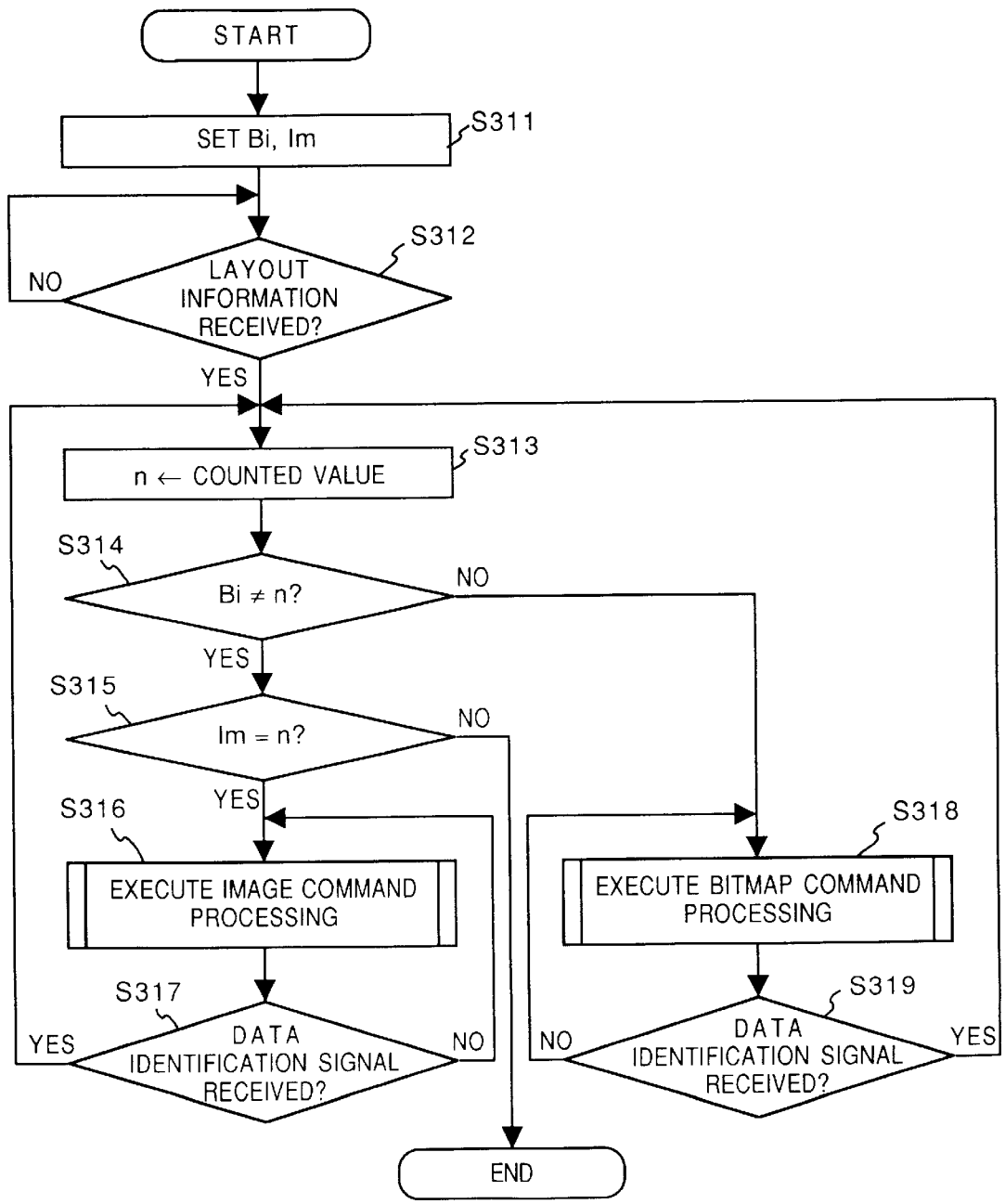
FIG. 25 is a flowchart illustrating a processing procedure according to the eighth embodiment.
Figure 26:
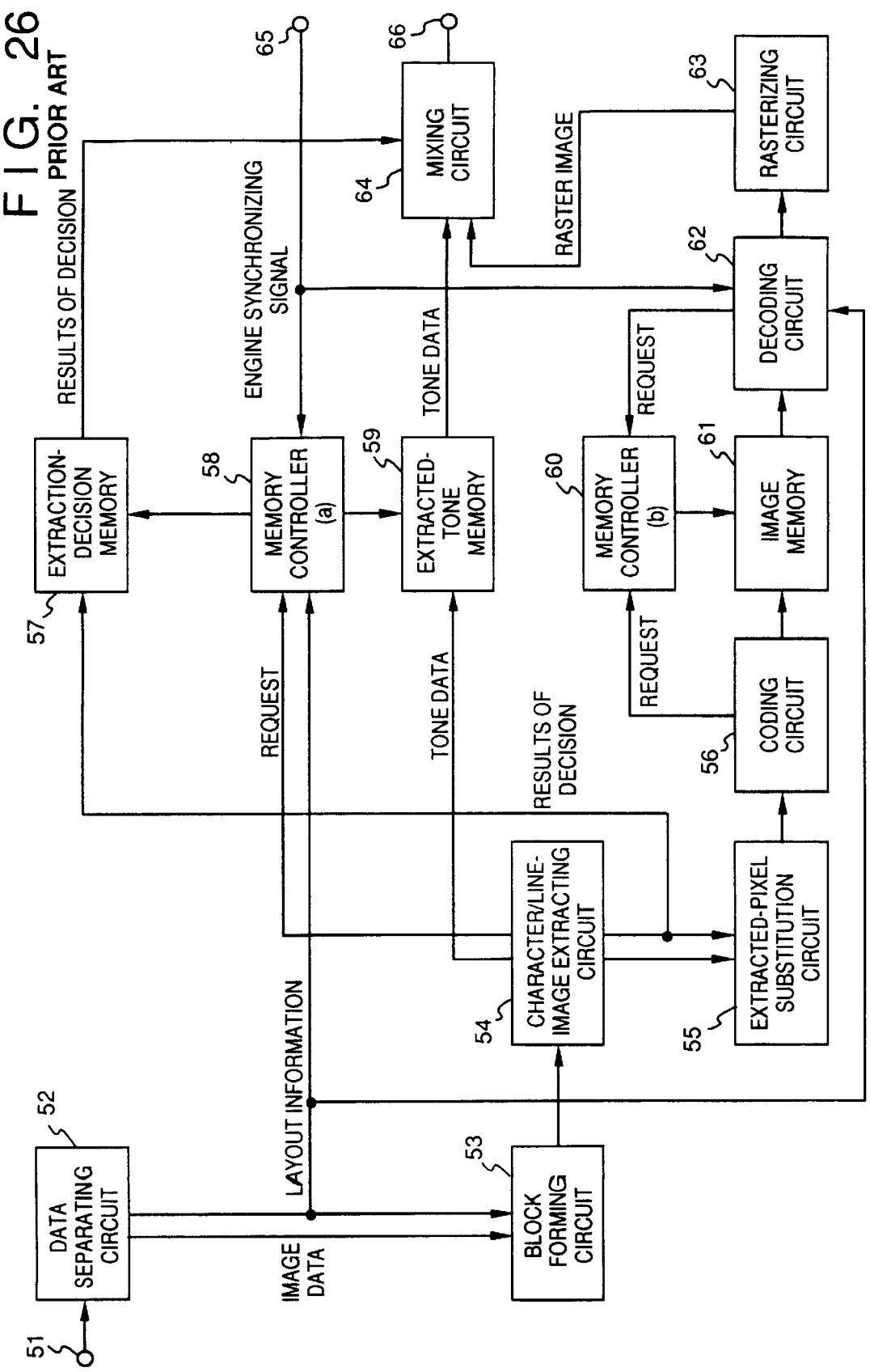
FIG. 26 is a block diagram showing an image processing apparatus using the proposed image information recording method.

FIG. 25 is a flowchart illustrating the flow of processing according to this embodiment. This is processing associated with entered commands.

At step S311 in the flowchart of this embodiment shown in FIG. 25, the amount of information of the header for the bitmap command is set as a variable Bi, and the amount of information of the header for the image command is set as a variable Im. By way of example, "11" as the amount of information in header 232a and "8" as the amount of information in header 233a, or "9" as the amount of information in header 235a and "6" as the amount of information in header 236a, are set as the variables Bi and Im, respectively.

Next, at step S312, the system waits for reception of the layout information. When the layout information is received, the amount of information contained in the received layout information is counted at step S313 and the value of the count is set as a variable n. This is followed by step S314, at which the variables Bi and n are compared. The program proceeds to step S318 if Bi=n holds and to step S315 if Bi≠n holds.

If Bi≠n holds, in this embodiment the variable Im and n are compared at step S315. The program proceeds to step S316 if Im=n holds and processing is terminated if Im≠n holds.

If Im=n holds, in this embodiment image-command data processing is executed at step S316, after which it is determined at step S317 whether the data identification signal has been received. The program returns to step S313 if the signal has been received and returns to step S316 if the signal has not been received. In other words, the image-command data processing of step S316 continues until the data identification signal is received.

If Bi=n is found to hold at step S314, in this embodiment bitmap-command data processing is executed at step S318, and then it is determined at step S319 whether the data identification signal has been received. The program returns to step S313 if the signal has been received and returns to step S318 if the signal has not been received. In other words, the bitmap-command data processing of step S318 continues until the data identification signal is received.

In the foregoing discussion and in FIG. 25, an example has been described in which the amount of information in a header and a counted value are compared in terms of agreement/non-agreement. However, the embodiment is not limited to such an arrangement. For example, the amount of information in the header and the counted value may be compared in terms of magnitude.

In accordance with this embodiment, as described above, effects similar to those of the seventh embodiment are obtained. Moreover, the break between a command and data can be determined by counting the data in the header of each command. In addition, the end of each command can be determined by the data identification signal. As a result, the command changeover code contained in the format of the seventh embodiment can be deleted. In accordance with this embodiment, therefore, a command changeover code need not be incorporated in the command transmission format. This makes it possible to simplify the command transmission format.

The present invention can be applied to a system constituted by a plurality of devices such as an image scanner, a host computer and a printer, etc., or to an apparatus comprising a single device such a copying machine.

Furthermore, it goes without saying that the invention is applicable also to a case where the object of the invention is attained by supplying a program to a system or apparatus via a memory medium such as a floppy disk, IC card or ROM, etc.

Furthermore, the printer used in the present invention is not limited to a page printer such as a laser-beam printer but may be a printer having a so-called bubble-jet head of the type which jets liquid droplets utilizing film boiling that relies upon thermal energy.

As many apparently widely different embodiments of the present invention can be made without departing from the spirit and scope thereof, it is to be understood that the invention is not limited to the specific embodiments thereof except as defined in the appended claims.

Especially, the idea of present invention includes arbitrary combination of concepts of the embodiments.

What is claimed is:

1. An image processing apparatus comprising:

inputting means for inputting an image for one screen, which includes images of first, second and third objects, wherein the second image of the second object may be overlapped with the first image of the first object, and the third image of the third object is included in the second object;

separating means for separating the input image into the first, second and third images by analyzing the input image;

generating means for generating bitmap data for the one screen, which indicates positions of the separated images, and storing the bitmap data into a first memory;

a second memory for respectively storing the separated first images as a same kind of image;

substituting means for substituting a substitute image related to peripheral pixels of the third object for the separated third image in each block having n×n pixels; and encoding means for block encoding the separated second image, which is subjected to the substitution, in the each block, and storing the block encoded image into a third memory.

2. The apparatus according to claim 1, further comprising mixing means for mixing the image for one screen by selectively outputting the image, in a pixel unit, from the images stored in said second memory and a decoded image of which the block encoded image stored in said third memory has been decoded in accordance with the bitmap data stored in said first memory.

3. The apparatus according to claim 1, wherein types of the images of the first and second objects are different.

4. The apparatus according to claim 1, wherein types of the images of the second and third objects are different.

5. The apparatus according to claim 1, wherein types of the images of the third and first objects are same.

6. The apparatus according to claim 1, wherein the first object is a character or line-image.

7. The apparatus according to claim 1, wherein the second object is a halftone image.

8. The apparatus according to claim 7, wherein the third object is a character or line-image.

9. The apparatus according to claim 1, wherein the block encoding is JPEG compression.

10. An image processing method comprising the steps of:

inputting an image for one screen, which includes images of first, second and third objects, wherein the second image of the second object may be overlapped with the first image of the first object, and the third image of the third object is included in the second object;

analyzing the input image;

separating the input image into the first, second and third images based on the analyzing result;

generating bitmap data for the one screen, which indicates positions of the separated images;

storing the bitmap data into a first memory;

respectively storing the separated first and third images into a second memory as a same kind of image;

substituting a substitute image related to peripheral pixels of the third object for the separated third image in each block having n×n pixels;

block encoding the separated second image, which is subjected to the substitution, in the each block; and storing the block encoded image into a third memory.

11. An image processing apparatus comprising:

inputting means for inputting an image for one screen, which includes images of first, second and third objects, wherein the second image of the second object may be overlapped with the first image of the first object, and the third image of the third object is included in the second object;

first separating means for separating the input image into the first image and another image;

second separating means for separating the another image into the second and third images by analyzing the another image;

generating means for generating bitmap data for the one screen, which indicates positions of the separated images, and storing the bitmap data into a first memory;

a second memory respectively storing the separated first and third images as the same kind of image;

substituting means for substituting a substitute image related to peripheral pixels of the third object for the separated third image in each block having n×n pixels; and encoding means for block encoding the separated second image, which is subjected to the substitution, in the each block, and storing the block encoded image into a third memory.

12. The apparatus according to claim 11, further comprising mixing means for mixing the image for one screen by selectively outputting an image, in a pixel unit, from the images stored in said second memory and a decoded image of which the block encoded image stored in said third memory has been decoded in accordance with the bitmap data stored in said first memory.

13. An image processing method comprising the steps of:

inputting an image for one screen, which includes images of first, second and third objects, wherein the second image of the second object may be overlapped with the first image of the first object, and the third image of the third object is included in the second object;

separating the input image into the first image and another image;

analyzing the another image;

separating the another image into the second and third images based on the analyzing result;

generating bitmap data for the one screen, which indicates positions of the separated images;

storing the bitmap data into a first memory;

respectively storing the separated first and third images into a second memory as a same kind of image;

substituting a substitute image related to peripheral pixels of the third object for the separated third image in each block having n×n pixels;

block encoding the separated second image, which is subjected to the substitution, in the each block; and storing the block encoded image into a third memory.

* * * * *

UNITED STATES PATENT AND TRADEMARK OFFICE
CERTIFICATE OF CORRECTION

PATENT NO.   :   6,084,984

DATED        :   July 4, 2000

INVENTOR(S)  :   HISASHI ISHIKAWA

It is certified that error appears in the above-identified patent and that said Letters Patent is hereby corrected as shown below:

IN THE DRAWINGS:

Sheet 1 of 28, FIG. 1, "POSITIONAL INFORMAITON" should read --POSITIONAL INFORMATION--;

Sheet 7 of 28, FIG. 7, "POSITIONAL INFORMAITON" should read --POSITIONAL INFORMATION--;

Sheet 8 of 28, FIG. 8, "POSITIONAL INFORMAITON" should read --POSITIONAL INFORMATION--;

Sheet 9 of 28, FIG. 9, "POSITIONAL INFORMAITON" should read --POSITIONAL INFORMATION--;

Sheet 10 of 28, FIG. 10, "POSITIONAL INFORMAITON" should read --POSITIONAL INFORMATION--; and Sheet 22 of 28, FIG. 22, "POSITIONAL INFORMAITON" should read --POSITIONAL INFORMATION--.

COLUMN 4:

Line 21, "comprises" should read --comprising--.

UNITED STATES PATENT AND TRADEMARK OFFICE
CERTIFICATE OF CORRECTION

PATENT NO.    : 6,084,984
DATED         : July 4, 2000
INVENTOR(S)   : HISASHI ISHIKAWA It is certified that error appears in the above-identified patent and that said Letters Patent is hereby corrected as shown below:

COLUMN 19:

Line 66, "an" should read --a--.

COLUMN 28:

Line 16, "first" should read --first and third--.

Signed and Sealed this

Tenth Day of April, 2001

Attest:

NICHOLAS P. GODICI

Attesting Officer    Acting Director of the United States Patent and Trademark Office